(12) United States Patent
Sundaresan et al.

(10) Patent No.: US 10,628,961 B2
(45) Date of Patent: Apr. 21, 2020

(54) OBJECT TRACKING FOR NEURAL NETWORK SYSTEMS

(71) Applicant: QUALCOMM Incorporated, San Diego, CA (US)

(72) Inventors: Sairam Sundaresan, San Diego, CA (US); Mithun Kumar Ranganath, San Diego, CA (US); Matthew Fischler, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/966,396

(22) Filed: Apr. 30, 2018

(65) Prior Publication Data

US 2019/0114804 A1 Apr. 18, 2019

Related U.S. Application Data

(60) Provisional application No. 62/572,050, filed on Oct. 13, 2017.

(51) Int. Cl.
*G06K 9/00* (2006.01)
*G06T 7/73* (2017.01)
(Continued)

(52) U.S. Cl.
CPC .......... *G06T 7/74* (2017.01); *G06K 9/00295* (2013.01); *G06K 9/00771* (2013.01);
(Continued)

(58) Field of Classification Search
CPC ... G06T 7/74; G06T 7/20; G06T 2207/20081; G06T 2207/20084; G06T 2210/12;
(Continued)

(56) References Cited

U.S. PATENT DOCUMENTS 9,342,759 B1 * 5/2016 Chen .................... G06K 9/6262
9,824,462 B2 * 11/2017 Mikiyas ............. G06K 9/00369
(Continued)

OTHER PUBLICATIONS

Fechner, Thomas, et al. "Learning target masks in infrared linescan imagery." Applications and Science of Artificial Neural Networks III. vol. 3077. International Society for Optics and Photonics, Apr. 4, 1997, pp. 323-332.*

(Continued)

*Primary Examiner* — Shefali D Goradia
(74) *Attorney, Agent, or Firm* — QUALCOMM Incorporated

(57) ABSTRACT

Techniques and systems are provided for tracking objects in one or more images. For example, a trained network can be applied to a first image of a sequence of images to detect one or more objects in the first image. The trained network can be applied to less than all images of the sequence of images. A second image of the sequence of images and a detection result from application of the trained network to the first image are obtained. The detection result includes the detected one or more objects from the first image. A first object tracker can be applied to the second image using the detection result from application of the trained network to the first image. Applying the first object tracker can include adjusting one or more locations of one or more bounding boxes associated with the detected one or more objects in the second image to track the detected one or more objects in the second image. A second object tracker can also be applied to the second image to track at least one object of the detected one or more objects in the second image. The second object tracker is applied to more images of the sequence of images than the trained network and the first object tracker. Object tracking can be performed for the second image based on application of the first object tracker and the second object tracker.

30 Claims, 12 Drawing Sheets

(51) Int. Cl.
   *G06T 7/20*   (2017.01)
   *G06K 9/62*   (2006.01)
   *G06K 9/66*   (2006.01)
(52) U.S. Cl.
   CPC ............. *G06K 9/6267* (2013.01); *G06K 9/66* (2013.01); *G06T 7/20* (2013.01); *G06T 2207/20081* (2013.01); *G06T 2207/20084* (2013.01); *G06T 2210/12* (2013.01)
(58) Field of Classification Search
   CPC ........... G06K 9/00295; G06K 9/00771; G06K 9/6267; G06K 9/66
   See application file for complete search history.

(56)          References Cited

U.S. PATENT DOCUMENTS

| | | | |
|---|---|---|---|
| 9,940,726 B2* | 4/2018 | Kim | G06T 7/251 |
| 2006/0291693 A1 | 12/2006 | Olson et al. | |
| 2013/0177203 A1 | 7/2013 | Koo et al. | |
| 2014/0369555 A1 | 12/2014 | Zhong et al. | |
| 2017/0161591 A1* | 6/2017 | English | G06N 3/0445 |
| 2018/0293445 A1* | 10/2018 | Gao | B60W 30/09 |

OTHER PUBLICATIONS

International Search Report and Written Opinion—PCT/US2018/050513—ISA/EPO—dated Dec. 5, 2018.
Yuankai Q., et al., "Hedged Deep Tracking", 2016 IEEE Conference on Computer Vision and Pattern Recognition (CVPR), IEEE, Jun. 27, 2016 (Jun. 27, 2016), pp. 4303-4311, XP033021616, DOI:10.1109/CVPR.2016.466, [retrieved on Dec. 9, 2016], abstract, p. 4305, p. 4307, p. 4310.

* cited by examiner

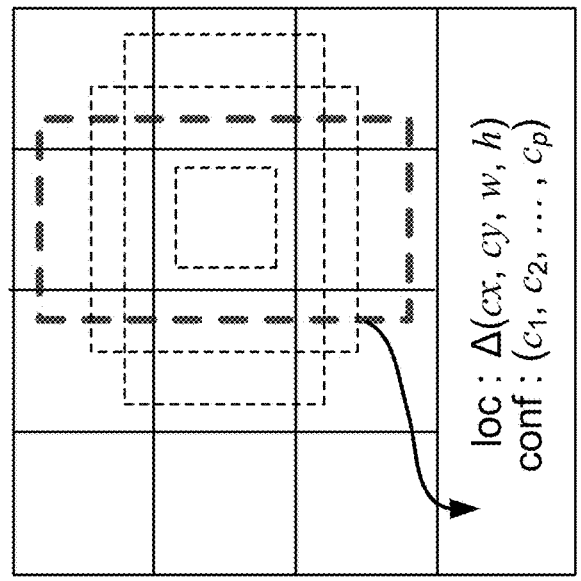
FIG. 7C 4 x 4 Feature Map
loc : $\Delta(cx, cy, w, h)$
conf : $(c_1, c_2, \ldots, c_p)$
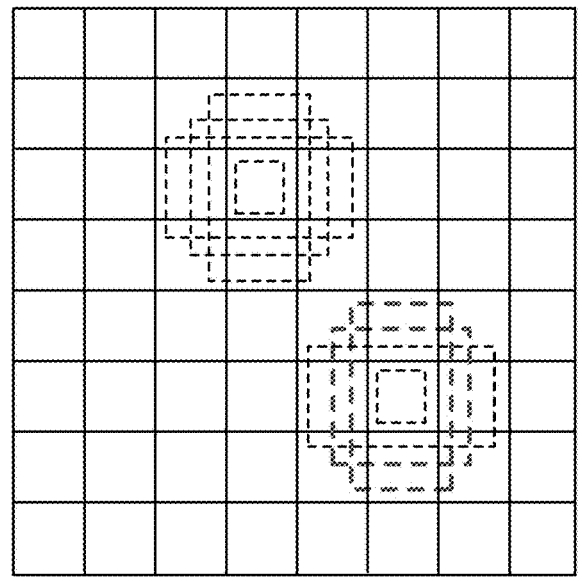
FIG. 7B 8 x 8 Feature Map
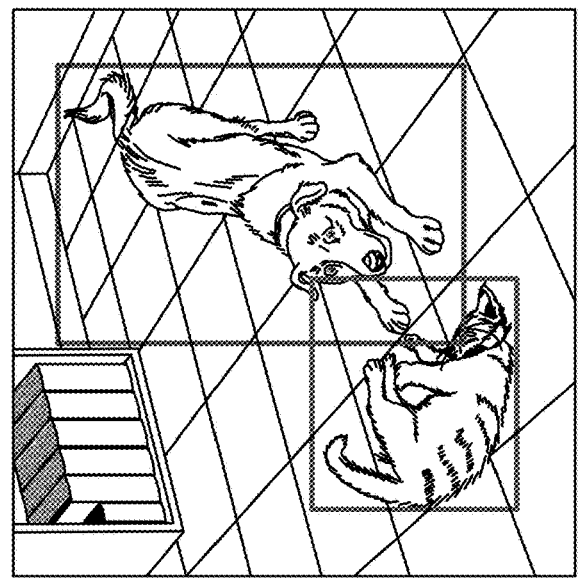
FIG. 7A Image with GT Boxes

900

APPLY A TRAINED NETWORK TO A FIRST IMAGE OF A SEQUENCE OF IMAGES TO DETECT ONE OR MORE OBJECTS IN THE FIRST IMAGE, WHEREIN THE TRAINED NETWORK IS APPLIED TO LESS THAN ALL IMAGES OF THE SEQUENCE OF IMAGES
902

OBTAIN A SECOND IMAGE OF THE SEQUENCE OF IMAGES AND A DETECTION RESULT FROM APPLICATION OF THE TRAINED NETWORK TO THE FIRST IMAGE, THE DETECTION RESULT INCLUDING THE DETECTED ONE OR MORE OBJECTS FROM THE FIRST IMAGE
904

APPLY A FIRST OBJECT TRACKER TO THE SECOND IMAGE USING THE DETECTION RESULT FROM APPLICATION OF THE TRAINED NETWORK TO THE FIRST IMAGE, WHEREIN APPLYING THE FIRST OBJECT TRACKER INCLUDES ADJUSTING ONE OR MORE LOCATIONS OF ONE OR MORE BOUNDING BOXES ASSOCIATED WITH THE DETECTED ONE OR MORE OBJECTS IN THE SECOND IMAGE TO TRACK THE DETECTED ONE OR MORE OBJECTS IN THE SECOND IMAGE
906

APPLY A SECOND OBJECT TRACKER TO THE SECOND IMAGE TO TRACK AT LEAST ONE OBJECT OF THE DETECTED ONE OR MORE OBJECTS IN THE SECOND IMAGE, WHEREIN THE SECOND OBJECT TRACKER IS APPLIED TO MORE IMAGES OF THE SEQUENCE OF IMAGES THAN THE TRAINED NETWORK
908

PERFORM OBJECT TRACKING FOR THE SECOND IMAGE BASED ON APPLICATION OF THE FIRST OBJECT TRACKER AND THE SECOND OBJECT TRACKER
910

FIG. 9

OBJECT TRACKING FOR NEURAL NETWORK SYSTEMS

CROSS-REFERENCE TO RELATED APPLICATIONS

This application claims the benefit of U.S. Provisional Application No. 62/572,050, filed Oct. 13, 2017, which is hereby incorporated by reference, in its entirety and for all purposes.

FIELD

The present disclosure generally relates to detecting and tracking objects in images, and more specifically to techniques and systems for detecting and tracking objects in images using neural network based detection.

BACKGROUND

Many devices and systems allow a scene to be captured by generating image and/or video data of the scene. For example, a camera can be used to capture images of a scene for recreational use, for surveillance, and/or for other applications. The image data from image capture devices and systems can be captured and output for processing and/or consumption.

Object recognition can be used to identify or verify an object from a digital image or a video frame of a video clip. One example of object recognition is face recognition, where a face of a person is detected and recognized. In some cases, the features of a face are extracted from an image and compared with features stored in a database in an attempt to recognize the face. In some cases, the extracted features are fed to a classifier and the classifier will give the identity of the input features.

In some cases, neural networks can be used to perform object detection and recognition, among other tasks. Given large amounts of data maintained by neural network based systems, such systems can general high quality object detection and recognition results. While neural networks (e.g., deep learning networks) have proven to be very versatile and accurate in a variety of tasks, such networks require high memory bandwidth and high computation cost.

BRIEF SUMMARY

In some examples, techniques and systems are described for providing a robust and real-time tracking system. For example, an object detection and tracking system can detect objects in images (or frames) by applying a trained neural network and one or more object trackers at different frame rates. For example, a computationally intensive trained neural network (also referred to as a "trained network") can be applied to images for detecting one or more objects in the images. The neural network can be complemented with a tracker that is lightweight, yet robust, for tracking the detected one or more objects across images. Another tracker, referred to herein as a strong tracker, can also be applied to perform lag compensation (or lag adjustment) to account for the delay caused by the trained neural network producing the result for an image (or frame) that has already passed due to the delay in applying the neural network to the image. As used herein, the term "real-time" refers to tracking objects in a sequence of images as the sequence of images is being captured and output.

In some cases, a multi-threaded approach may be used to apply the trained neural network and the one or more object trackers. For instance, the trained neural network and the one or more trackers can run on different individual threads. In one example, the trained neural network can run on a low frame per second (fps) thread, allowing the neural network to run at its own speed and deliver results (e.g., detection, recognition, and/or classification) when the neural network is finished processing the objects in an image. In another example, the lightweight (or "weak") object tracker can run on a high fps thread, which allows the lightweight object tracker to track multiple objects simultaneously at a quicker frame rate than that at which the trained neural network is applied. When used, the strong tracker can operate on the results from the trained neural network, in which case the strong tracker can also run on a low fps thread.

In some implementations, the trained neural network can include a deep learning network. In one illustrative example, a neural network detection system can apply a deep learning based detector to detect and classify (or categorize) the one or more objects in images. For instance, a deep learning based detector can include a deep learning network (also referred to as a deep network and a deep neural network) to identify objects in an image based on past information about similar objects that the detector has learned based on training data (e.g., training data can include images of objects used to train the system). Any suitable type of deep learning network can be used, including convolutional neural networks (CNNs), autoencoders, deep belief nets (DBNs), Recurrent Neural Networks (RNNs), among others. An object classified by a the neural network can be localized using a bounding region (e.g., a bounding box or other bounding region) representing the classified object.

In some examples, the object detection and tracking system can include a static buffer for object tracking and a dynamic buffer for object detection and classification. The object tracking buffer is referred to as a static buffer because the buffer size and offset (location) are not changed from frame to frame. The object detection and classification buffer is referred to as a dynamic buffer because the buffer offset (location) and size can be changed from frame to frame. In some cases, the static buffer of object tracking can be the same size as the input image buffer, while the dynamic buffer of object detection and classification is smaller in size than the input image buffer. In some cases, characteristics of a dynamic buffer can be based on a region of interest (ROI) determined in a frame. Examples of dynamic buffer characteristics include scale, size, and offset (location within the frame).

According to at least one example, a method of tracking objects in one or more images is provided. The method includes applying a trained network to a first image of a sequence of images to detect one or more objects in the first image. The trained network is applied to less than all images of the sequence of images. The method further includes obtaining a second image of the sequence of images and a detection result from application of the trained network to the first image. The detection result includes the detected one or more objects from the first image. The method further includes applying a first object tracker to the second image using the detection result from application of the trained network to the first image. Applying the first object tracker includes adjusting one or more locations of one or more bounding boxes associated with the detected one or more objects in the second image to track the detected one or more objects in the second image. The method further includes applying a second object tracker to the second image to track at least one object of the detected one or more objects in the second image. The second object tracker is applied to more images of the sequence of images than the trained network. The method further includes performing object tracking for the second image based on application of the first object tracker and the second object tracker.

In another example, an apparatus for tracking objects in one or more images is provided that includes a memory configured to store video data and a processor. The processor is configured to and can apply a trained network to a first image of a sequence of images to detect one or more objects in the first image. The trained network is applied to less than all images of the sequence of images. The processor is further configured to and can obtain a second image of the sequence of images and a detection result from application of the trained network to the first image. The detection result includes the detected one or more objects from the first image. The processor is further configured to and can apply a first object tracker to the second image using the detection result from application of the trained network to the first image. Applying the first object tracker includes adjusting one or more locations of one or more bounding boxes associated with the detected one or more objects in the second image to track the detected one or more objects in the second image. The processor is further configured to and can apply a second object tracker to the second image to track at least one object of the detected one or more objects in the second image. The second object tracker is applied to more images of the sequence of images than the trained network. The processor is further configured to and can perform object tracking for the second image based on application of the first object tracker and the second object tracker.

In another example, a non-transitory computer-readable medium is provided that has stored thereon instructions that, when executed by one or more processors, cause the one or more processor to: apply a trained network to a first image of a sequence of images to detect one or more objects in the first image, wherein the trained network is applied to less than all images of the sequence of images; obtain a second image of the sequence of images and a detection result from application of the trained network to the first image, the detection result including the detected one or more objects from the first image; apply a first object tracker to the second image using the detection result from application of the trained network to the first image, wherein applying the first object tracker includes adjusting one or more locations of one or more bounding boxes associated with the detected one or more objects in the second image to track the detected one or more objects in the second image; apply a second object tracker to the second image to track at least one object of the detected one or more objects in the second image, wherein the second object tracker is applied to more images of the sequence of images than the trained network; and perform object tracking for the second image based on application of the first object tracker and the second object tracker.

In another example, an apparatus for tracking objects in one or more images is provided. The apparatus includes means for applying a trained network to a first image of a sequence of images to detect one or more objects in the first image. The trained network is applied to less than all images of the sequence of images. The apparatus further includes means for obtaining a second image of the sequence of images and a detection result from application of the trained network to the first image. The detection result includes the detected one or more objects from the first image. The apparatus further includes means for applying a first object tracker to the second image using the detection result from application of the trained network to the first image. Applying the first object tracker includes adjusting one or more locations of one or more bounding boxes associated with the detected one or more objects in the second image to track the detected one or more objects in the second image. The apparatus further includes means for applying a second object tracker to the second image to track at least one object of the detected one or more objects in the second image. The second object tracker is applied to more images of the sequence of images than the trained network. The apparatus further includes means for performing object tracking for the second image based on application of the first object tracker and the second object tracker.

In some aspects, the one or more locations of the one or more bounding boxes associated with the detected one or more objects in the second image are adjusted based on an estimated movement of the one or more objects between the first image and the second image.

In some cases, the second object tracker is applied to more images of the sequence of images than the trained network and the first object tracker. In some aspects, the second object tracker is applied to each image of the sequence of images to track one or more objects in each image.

In some aspects, the at least one object tracked by the second object tracker in the second image is based on a previous application of the trained network to a previous image obtained before the first image.

In some aspects, the methods, apparatuses, and computer-readable medium described above further comprise: associating the one or more objects tracked by the first object tracker with the at least one object tracked by the second object tracker; generating a final set of one or more tracked objects for the second image based on the associating the one or more objects tracked by the first object tracker with the at least one object tracked by the second object tracker. In such aspects, the object tracking is performed for the second image using the final set of one or more tracked objects.

In some aspects, associating the one or more objects tracked by the first object tracker with the at least one object tracked by the second object tracker includes: comparing a tracking result from the first object tracker for a first object to a tracking result from the second object tracker for the first object; and performing the object tracking for the second image using the tracking result from the first object tracker when a confidence of the tracking result from the first object tracker is greater than a confidence of the tracking result from the second object tracker.

In some aspects, associating the one or more objects tracked by the first object tracker with the at least one object tracked by the second object tracker includes: comparing a tracking result from the first object tracker for a first object to a tracking result from the second object tracker for the first object; and performing the object tracking for the second image using the tracking result from the second object tracker when a confidence of the tracking result from the second object tracker is greater than a confidence of the tracking result from the first object tracker.

In some aspects, the tracking result from the first object tracker or the second object tracker includes a bounding box and wherein the confidence of the tracking result from the first object tracker or the confidence of the tracking result from the second object tracker includes a confidence level based on application of the trained network. The confidence level indicates a likelihood that an object associated with a bounding box includes a category.

In some aspects, the methods, apparatuses, and computer-readable medium described above further comprise: applying the second object tracker to a third image to track the at least one object in the third image, wherein the trained network and the first object tracker are not applied to the third image; comparing a tracking result from the second object tracker for the at least one object in the third image to a tracking result from the first object tracker for the at least one object in the second image; and determining whether to track the at least one object in the third image based on the comparing. In some cases, the at least one object is tracked in the third image when a result of the comparing is above a quality threshold. In some aspects, the comparing includes determining a correlation between the tracking result from the second object tracker and the tracking result from the first object tracker. In some aspects, the at least one object is tracked in the third image when the correlation is above a threshold correlation.

In some aspects, the apparatus can comprise a camera for capturing the one or more images. In some aspects, the apparatus comprises a mobile device with a camera for capturing the one or more images. In some aspects, the apparatus comprises a display for displaying the one or more images.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 7A-FIG. 7C are diagrams illustrating an example of a single-shot object detector, in accordance with some examples.

FIG. 9 is a flowchart illustrating an example of a process of tracking objects in one or more images, in accordance with some embodiments.

DETAILED DESCRIPTION

Figure 1:
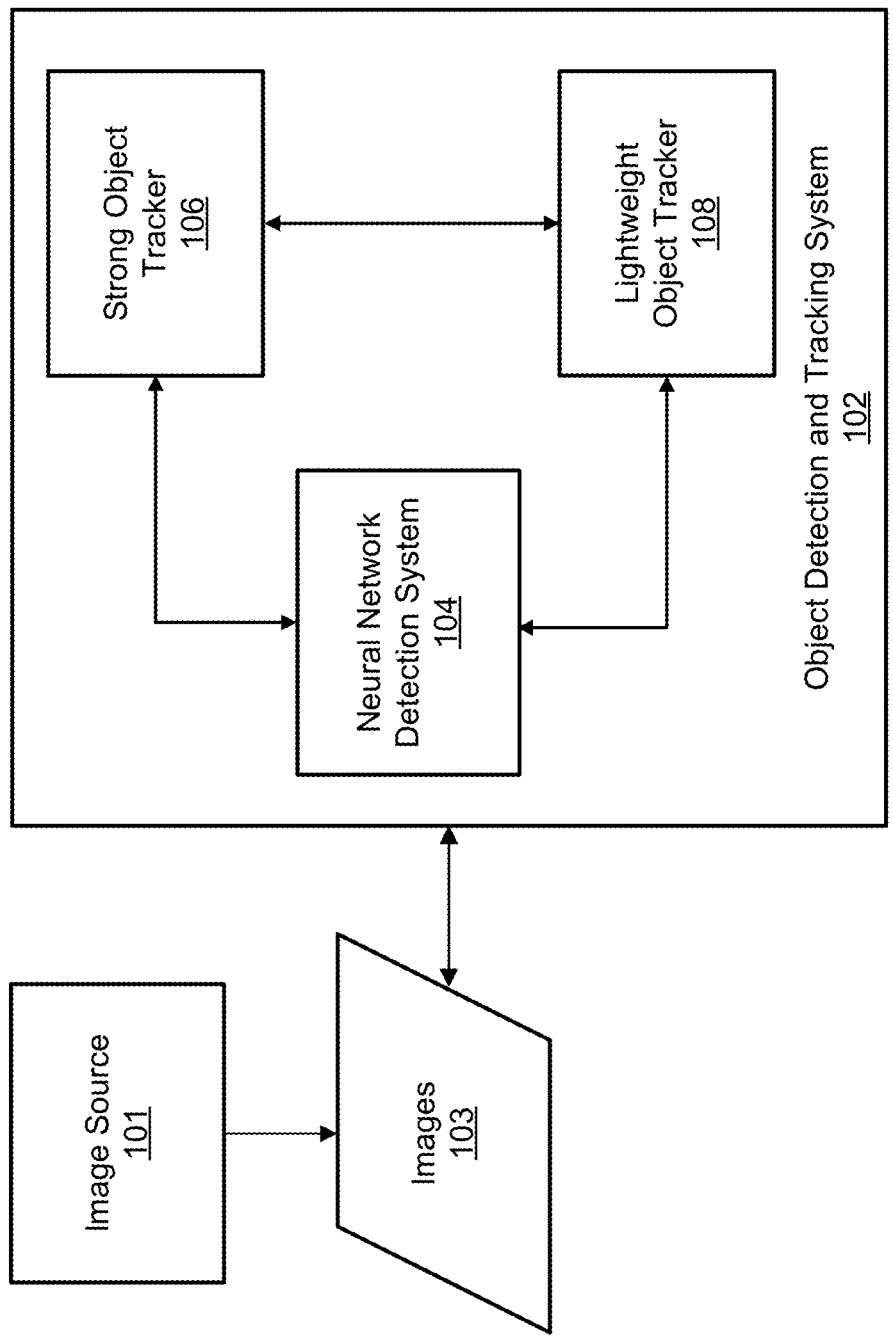
FIG. 1 is a block diagram illustrating an example of an object detection and tracking system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As described in more detail herein, an object detection and tracking system can detect objects in one or more images using a trained neural network based detector. The results from the neural network based detector can be used to initialize an object tracker (referred to as a lightweight or weak object tracker) that can then track the objects across subsequent images. An additional object tracker, referred to herein as a strong object tracker, can also be applied to perform lag compensation to account for the delay caused by the amount of time the trained neural network takes to produce the detection result for an image.

FIG. 1 is a block diagram illustrating an example of an object detection and tracking system 102. The object detection and tracking system 102 receives images 103 from an image source 101. In some cases, the images 103 can include video frames of one or more video sequences. Video frames can also be referred to herein as video pictures or pictures. In some cases, the images 103 can include single shot images that are not part of a sequence of video frames. For example, the images 103 can include a single image captured using a digital camera or other image capture device.

The image source 101 can include an image capture device and/or a video capture device (e.g., a video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image content. In one illustrative example, the image source 101 can include an IP camera or multiple IP cameras. In some cases, multiple IP cameras can be located throughout an environment, and can provide the images 103 to the object detection and tracking system 102. For instance, the IP cameras can be placed at various fields of view within the environment so that surveillance can be performed based on captured video frames of the environment. In another illustrative example, the image source 101 can include a mobile phone or tablet that can capture images and/or videos.

In some implementations, the object detection and tracking system 102 and the image source 101 can be part of the same computing device. For example, in some cases, a camera, phone, tablet, and/or other device with an image source (e.g., a camera, storage, or the like) can include an integrated object detection and tracking system. In some implementations, the object detection and tracking system 102 and the image source 101 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The object detection and tracking system 102 includes a neural network detection system 104, a strong object tracker 106, and a lightweight object tracker 108, which together can perform object detection and tracking for the images 103. For example, the neural network detection system 104 can detect one or more objects in images 103 of a sequence of images (e.g., video frames of a video sequence), and the strong object tracker 106 and lightweight object tracker 108 can perform various operations to track the one or more objects across the images of the sequence of images.

Object detection and tracking allows the object detection and tracking system 102 to provide various features. For example, many image post-processing applications use region of interest information for processing certain portions of an image. The bounding regions from the object detection and tracking system 102 can be used for such post-processing applications. For example, a bounding region for an object can be used as a region of interest for performing processing of the object. In some illustrative examples, autofocus, AAA adjustments, auto exposure, auto white balance (AWB), auto zoom, intelligent motion detection, intrusion detection, and other applications can use the detection and tracking results from the object detection and tracking system 102. Other features, such as people, vehicle, or other object counting and classification can be greatly simplified based on the results of object detection and tracking. In some cases, the bounding regions can be output for display. For example, a bounding region can be displayed as surrounding the object that is being tracked using the bounding box.

In some examples, the lightweight object tracker 108 can generate and output trackers for each object that is being tracked. Each tracker output by the lightweight object tracker 108 can be represented by a tracker bounding region and can be assigned a tracker identifier (ID). A bounding region of a tracker can include a bounding box, a bounding circle, a bounding ellipse, or any other suitably-shaped region representing a tracker. While examples are described herein using bounding boxes for illustrative purposes, the techniques and systems described herein can also apply using other suitably shaped bounding regions. A bounding box associated with a tracker can have a rectangular shape, a square shape, or other suitable shape.

In some examples, a bounding box of a tracker for an object in a current frame can be based on the bounding box of the tracker for the object in a previous frame. For instance, when the tracker is updated in the previous frame, updated information for the tracker can include the tracking information for the previous frame and also a prediction of a location of the tracker in the next frame (which is the current frame in this example). The prediction of the location of the tracker in the current frame can be determined based on the location of the tracker in the previous frame and various techniques. A history can be maintained for a tracker. For example, the history maintained for a tracker can include positions of the bounding boxes that the tracker has been tracking, their reliability scores (e.g., correlation or other reliability metric), confidence values of the detection associated with each bounding box, feature points for each box, and/or any other suitable information.

The neural network detection system 104 can apply a trained neural network based object detector to the images 103 to detect one or more objects in the images 103. In some examples, the trained neural network can include a deep learning neural network (also referred to as a deep network and a deep neural network). For instance, the neural network detection system 104 can apply a deep learning based detector to detect the one or more objects in the images 103. The neural network can detect or identify objects in an image based on past information about similar objects that the detector has learned using training data. In some cases, training data can include images of objects used to train the system. For example, a deep learning network can identify objects in an image based on knowledge gleaned from training images (or other data) that include similar objects and labels indicating the classification of those objects. Any suitable type of deep learning network can be used, such as convolutional neural networks (CNNs), autoencoders, deep belief nets (DBNs), Recurrent Neural Networks (RNNs), among others. An object classified by a the neural network can be localized using a bounding region (e.g., a bounding box or other bounding region) representing the classified object.

A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the network includes feature maps or activation maps that can include nodes. A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics. For a classification network, the deep learning system can classify an object in an image or video frame using the determined high-level features. The output can be a single class or category, a probability of classes that best describes the object, or other suitable output. For example, the output can include probability values indicating probabilities (or confidence levels or confidence values) that the object includes one or more classes of objects (e.g., a probability the object is a person, a probability the object is a dog, a probability the object is a cat, or the like).

In some cases, nodes in the input layer can represent data, nodes in the one or more hidden layers can represent computations, and nodes in the output layer can represent results from the one or more hidden layers. In one illustrative example, a deep learning neural network can be used to determine whether an object in an image or a video frame is a person. In such an example, nodes in an input layer of the network can include normalized values for pixels of an image (e.g., with one node representing one normalized pixel value), nodes in a hidden layer can be used to determine whether certain common features of a person are present (e.g., two legs are present, a face is present at the top of the object, two eyes are present at the top left and top right of the face, a nose is present in the middle of the face, a mouth is present at the bottom of the face, and/or other features common for a person), and nodes of an output layer can indicate whether a person is detected or not. This example network can have a series of many hidden layers, with early layers determining low-level features of the object in the video frame (e.g., curves, edges, and/or other low-level features), and later layers building up a hierarchy of more high-level and abstract features of the object (e.g., legs, a head, a face, a nose, eyes, mouth, and/or other features). Based on the determined high-level features, the deep learning network can classify the object as being a person or not (e.g., based on a probability of the object being a person relative to a threshold value). Further details of the structure and function of neural networks are described below with respect to FIG. 5 and FIG. 6.

Various deep learning-based detectors can be used by the neural network detection system 104 to detect or classify objects in video frames. For example, SSD is a fast single-shot object detector that can be applied for multiple object categories. A feature of the SSD model is the use of multi-scale convolutional bounding box outputs attached to multiple feature maps at the top of the neural network. Such a representation allows the SSD to efficiently model diverse box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 2014, which is hereby incorporated by reference in its entirety for all purposes. Further details of the SSD detector are described below with respect to FIG. 7A-FIG. 7C. Another example of a deep learning-based detector that can be used to detect or classify objects in video frames includes the You only look once (YOLO) detector. The YOLO detector, when run on a Titan X, processes images at 40-90 fps with a mAP of 78.6% (based on VOC 2007). The SSD300 model runs at 59 FPS on the Nvidia Titan X, and can typically execute faster than the current YOLO 1. YOLO 1 has also been recently replaced by its successor YOLO 2. A YOLO deep learning detector is described in more detail in J. Redmon, S. Divvala, R. Girshick, and A. Farhadi, "You only look once: Unified, real-time object detection," arXiv preprint arXiv: 1506.02640, 2015, which is hereby incorporated by reference in its entirety for all purposes. Further details of the YOLO detector are described below with respect to FIG. 8A-FIG. 8C. While the SSD and YOLO detectors are described to provide illustrative examples of deep learning-based object detectors, one of ordinary skill will appreciate that any other suitable neural network can be used by the neural network detection system 104.

Neural network-based detectors, such as deep learning based detectors, have high memory bandwidth and high computation cost. For example, many deep network models have several layers and nodes resulting in high usage of memory. Further, many deep network models are deployed on very advanced graphics processing units (GPUs) and/or cloud servers since they are computationally complex. Deep learning-based detectors can only achieve real-time performance on certain GPUs (e.g., an Nvidia graphics card). Experiments even suggest that it could take many seconds to finish object detection for one frame. Without GPUs or other optimization hardware, these deep networks run very slowly, making real-time use almost impossible, especially on mobile platforms. For example, due to the slow nature of deep neural networks, tracking results of such networks cannot be generated in real-time on camera devices (e.g., at 30 fps).

There are further optimizations in terms of deep learning algorithms, including using GoogLeNet v2 to replace VGG in SSD. In low-tier chipsets, such as the SD625, the CPUs are much slower and the absence of a high-performance vector-DSP, such as the HVX (Hexagon Vector eXtensions), prevents efficient parallel processing. In addition, the GPU in a SD625 chipset has performance capabilities that are far inferior to the Nvidia Titan X. So, the fastest deep learning-based detector (even by using the GPU) is still expected to consume 0.5-1 second for one frame.

The neural network detection system 104, the strong object tracker 106, and the lightweight object tracker 108 can be applied at different frame rates in order to provide a robust and real-time tracking system. As used herein, the term "real-time" refers to tracking objects in a sequence of images as the sequence of images is being captured and output. A multi-threaded approach can be used to apply the neural network-based detection and the strong and lightweight object trackers 106 and 108, in which case the neural network detection system 104, the strong object tracker 106, and the lightweight object tracker 108 can run on different individual threads. For example, the neural network detection system 104 can run on a low frame per second (fps) thread to allow the neural network to be run at its own speed and deliver results (e.g., detection, recognition, and/or classification) when the neural network is finished processing the objects in a given image. The strong object tracker 106 can be run whenever the results from the neural network detection system 104 are available. The lightweight object tracker 108 can run on a high fps thread, allowing the lightweight object tracker 108 to track multiple objects simultaneously at a quicker frame rate (e.g., at every frame) than that at which the neural network detection system 104 is applied.

The lightweight object tracker 108 is initialized using results from the neural network detection system 104 and the strong object tracker 106. For example, there are no detected objects to track until the neural network detection system 104 provides detection results for an image or frame. There is a delay from when the neural network detection system 104 begins processing a frame for object detection to when the system 104 actually finishes the detection process and generates detection results. In one illustrative example, a first video frame (frame 1) of a video sequence includes three objects, referred to as object 1, object 2, and object 3. The neural network detection system 104 can be run on the first frame and can detect two of the three objects (objects 1 and 2, but not object 3), which can be represented by two bounding boxes. However, due to the complexity of the trained neural network run by the neural network detection system 104, the detection results are not available until frame 7. At frame 7, the results from the neural network detection system 104 are passed to the strong object tracker 106. As described in more detail below, the strong object tracker 106 performs lag compensation and shifts the two bounding boxes for objects 1 and 2 from the position of the objects in frame 1 to the position where the objects are in frame 7. The shifted results (e.g., the shifted bounding boxes) are then used to initialize the lightweight object tracker 108, after which the lightweight object tracker 108 now has two objects to track from frame 7 onward. As described in more detail below, when the lightweight object tracker 108 is initialized, thumbnails of the shifted bounding boxes can be saved for computing correlation. A thumbnail of a bounding box can include a captured image of a region of a frame (or a cropped image) encompassed by the bounding box. For example, the thumbnail of a bounding box can be obtained by cropping the input image using the coordinates of the bounding box.

As more detection results from the neural network detection system 104 are processed by the strong object tracker and provided to the lightweight object tracker 108, the lightweight object tracker 108 can merge the results with the currently maintained tracked objects, and can update the number of maintained tracked objects accordingly. In some cases, tracked objects maintained by the lightweight object tracker 108 can be removed when certain conditions are met (e.g., lack of correlation with a detected object).

Once initialized, the lightweight object tracker 108 tracks objects across frames of the video sequence by estimating locations of the objects from one frame to another. The strong object tracker 106 tracks objects in a frame of the video sequence when the object detection results are available from the neural network detection system 104. Locations of the tracker bounding boxes associated with the tracked objects are adjusted from one frame to another frame by the lightweight object tracker 108 and by the strong object tracker 106 based on the estimated movement of the objects. Various tracking techniques can be used by the lightweight object tracker 108 and the strong object tracker 106 to estimate the locations of the objects in each frame. Examples of trackers that can be used include optical flow based trackers, template matching based trackers, meanshift trackers, continuously adaptive meanshift (camshift) trackers, Kernelized Correlation Filters (KCF) trackers, Kalman filter based trackers, or other suitable tracker can be used.

In some cases, dense optical flow based trackers can estimate the motion vector of pixels (in some cases, all pixels) in a video frame in order to track the movement of the pixels across video frames. For instance, image motion can be recovered at each pixel from spatio-temporal image brightness variations. In some cases, sparse optical flow based trackers (e.g., the Kanade-Lucas-Tomashi (KLT) tracker) can track the location of one or more specific feature points (e.g., one or more corners, textured areas, edges, or other distinct or visual features) in an image.

Template matching based trackers obtain a template of an image feature that is to be tracked across images, and use the template to search for the image feature in the images. For example, as the template slides across an input image, the template is compared or matched to the portion of the image directly under it. The matching is performed by calculating a number that indicates the extent to which the template and the portion of the original image at which the template is currently located are equal (or correlated). The location in the original image that has the greatest correlation (minimum difference from the template) is where the image feature represented by the template is located in the original image. The matching number can depend on the calculation that is used by the template matching algorithm. In one illustrative example, a complete match can be denoted by a 0 (indicating zero difference between the template and the portion of the original image) or a 1 (indicating a complete match).

Meanshift and camshift trackers locate the maxima of a density function to perform tracking. For instance, given a set of points, such as a pixel distribution (e.g., using a histogram backprojected image, which records how well the pixels of a given image fit the distribution of pixels in a histogram model, or other suitable distribution) and a window region, the meanshift tracker can move the window region to the area of maximum pixel density (e.g., to the area with a maximum number of points in the distribution). When an object moves from one image to another, the movement is reflected in pixel distribution (e.g., the histogram back-projected image). The meanshift tracker can then move the window region to the new location with maximum density. A camshift tracker is a modified meanshift tracker that can adapt the window size using a size and rotation of the target object. The camshift tracker can first apply the meanshift operation, and once the meanshift converges, the camshift tracker updates the size of the window (e.g., with the updated size $$s = 2 \times \sqrt{\frac{M_{00}}{256}}).$$

The camshift tracker can also calculate the orientation of a best fitting shape (e.g., ellipse, circle, square, or the like) to the target. The tracker can apply the meanshift technique with a new scaled search window and previous window location. The process is continued until the required accuracy is achieved.

A KCF filter is a correlation filter based trackers, and attempts to identify the best filter taps that maximize the response when correlated with a target template that looks similar in appearance to training data. KCF tracks objects by solving a simple rigid regression problem over training data in the dual form, which allows the use of both multi-dimensional features and non-linear kernels (e.g., Gaussian).

A Kalman filter based object tracker uses signal processing to predict the location of a moving object based on prior motion information. For example, the location of a tracker in a current frame can be predicted based on information from a previous frame. In some cases, the Kalman filter can measure a tracker's trajectory as well as predict its future location(s). For example, the Kalman filter framework can include two steps. The first step is to predict a tracker's state, and the second step is to use measurements to correct or update the state. In this case, the tracker from the last frame can predict its location in the current frame. When the current frame is received, the tracker can use the measurement of the object in the current frame to correct its location in the current frame, and then can predict its location in the next frame. The Kalman filter can rely on the measurement of the associated object(s) to correct the motion model for the object tracker and to predict the location of the tracker in the next frame.

In some cases, the lightweight object tracker 108 can use a tracking technique, such as an optical flow based tracker or other lightweight tracker, that uses less resources than other tracking techniques so that tracking can be performed more quickly and so that more resources are available for the neural network detection system 104 and the strong object tracker 106. The strong object tracker 106 can use a more resource intensive tracker technique than the lightweight object tracker 108, such as a KCF tracker, template matching based tracker, a camshift tracker, a meanshift tracker, or the like. In one illustrative example, the lightweight object tracker 108 may use an optical flow based tracker, while the strong object tracker 106 may use a KCF based tracker, a camshift based tracker, a template matching based tracker, or some other tracker.

Figure 2:
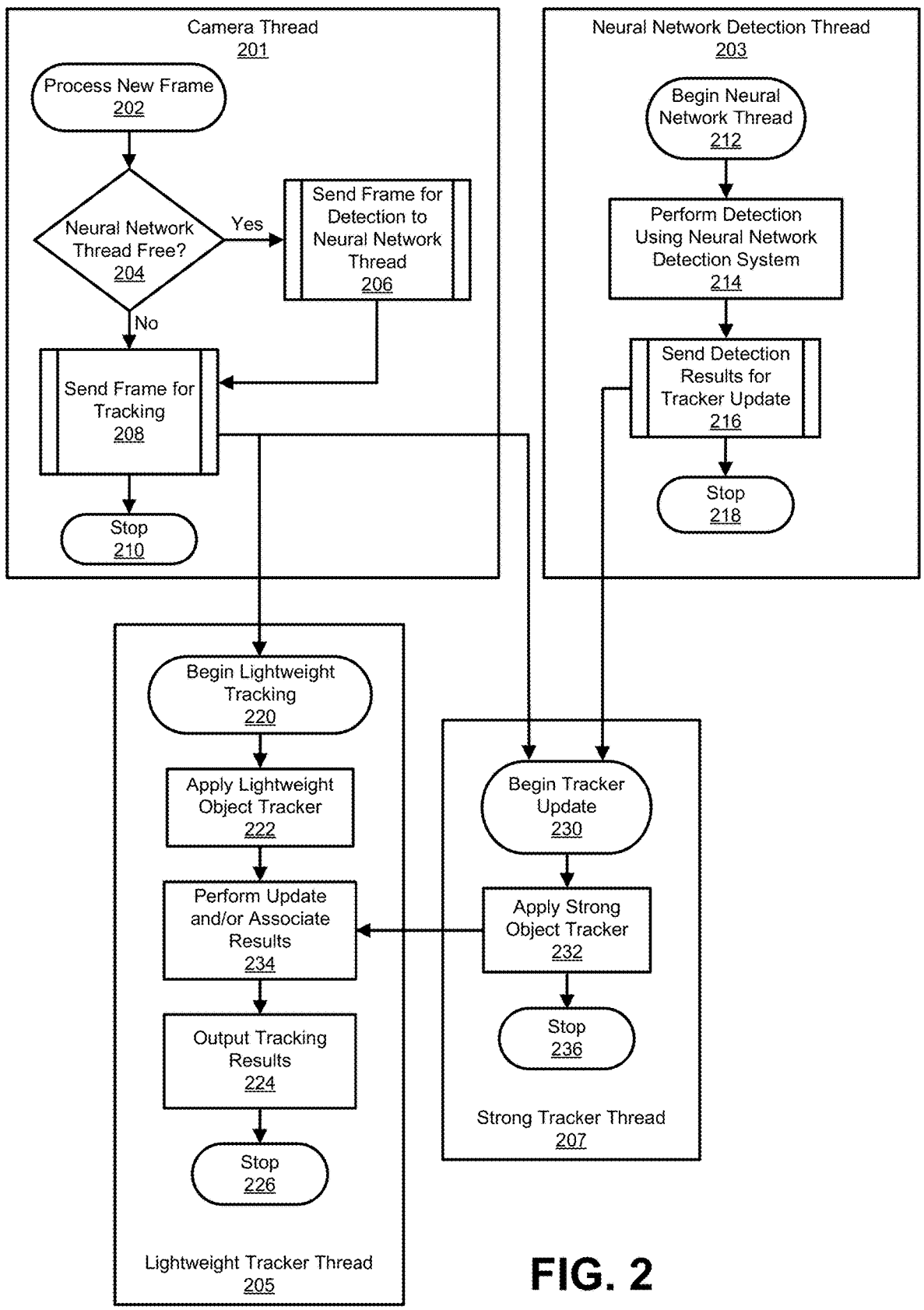
FIG. 2 is a diagram illustrating an example of different threads of the object detection and tracking process, in accordance with some embodiments.

FIG. 2 is a diagram illustrating an example of different threads of the object detection and tracking system 102. The camera thread 201 can be run by a camera of a device when a new frame or image is available for processing. For example, at block 202, a new frame is processed. The new frame can include a frame of a video sequence. The new frame is also referred to as a current frame, which is the frame that is currently being processed. In some implementations, an image reader including a callback interface can be used and can be notified that a new frame or image is available. In some cases, block 202 can utilize an onImageAvailable callback that can be called per image basis, meaning that block 202 can be invoked for every new frame that is available from the image reader. The onImageAvailable callback is called when a new frame is available from the image reader.

At block 204, the camera thread 201 checks whether the neural network detection thread 203 is free for the current frame. For example, the neural network detection system may only perform object detection for one current frame or image at a time, in which case the neural network detection system 104 may not be free for performing object detection for other frames until detection results are available for the current frame. The neural network detection thread 203 may take a different amount of time (corresponding to a certain number of frames) for different images based on how many objects are in the image and how complex the scene depicted in the image is. In one illustrative example, the neural network detection thread 203 may take 15 frames (approximately 0.5 seconds in a 30 fps system) to complete object detection for a frame number 1 of a video sequence. In such an example, the detection results will not be available for frame number 1 until frame number 15 or 16 of the video sequence. Based on the 15 frame delay, the neural network detection thread 203 will not be available for frames 2-15 of the video sequence, and cannot be used again until frame 16. If the neural network detection thread 203 is not free for a current frame, at block 208, the camera thread 201 sends the current frame for tracking to the lightweight tracker thread 205. The camera thread stops at block 210 after sending a current frame to the lightweight tracker thread 205.

If the neural network detection thread 203 is free for a current frame, the camera thread 201, at block 206, sends the current frame for detection to the neural network detection thread 203. In addition to sending the current frame for detection, the camera thread 201 sends the current frame for tracking to the lightweight tracker thread 205 at block 208. The neural network detection thread 203 begins at block 212 once the current frame is received. The neural network detection thread 203 performs detection at block 214 using the neural network detection system 104 to detect one or more of the objects in the current frame. For example, if there are three objects in a current frame of the video sequence, the neural network detection system 104 can detect one, two, or all three of the objects, depending on the accuracy of the detector and the conditions of the video frame. For example, some object detectors perform better for larger objects, and may not detect smaller objects. In another example, an object may be occluded partially or fully, in which case the detector may not detect the object. Many other conditions, such as lighting, shadows, movement, among others, can cause an object to not be detected in an image.

Once one or more of the objects in the current frame are detected, the neural network detection thread 203 outputs, at block 216, the object detection results to the strong tracker thread 207. The neural network detection thread 203 then stops the current instance of the thread at block 218. As noted previously, the object detection results for a current frame will take several frames to generate, in which case the strong tracker thread 207 will receive the detection results for a current frame when a subsequent frame is being processed by the lightweight object tracker 108. Using the example from above, the neural network detection thread 203 can run on a current frame and can detect two of the three objects in the current frame. In one example, the results from the detection performed for the current frame (frame 1) may not be available until frame 15. Once available, the results from the detection can be passed to the strong tracker thread 207 at frame 15.

At block 230, the strong tracker thread 207 begins the tracker update to update the trackers that will be used by the lightweight tracker thread 205. At block 232, the strong object tracker 106 is applied to a current frame (e.g., frame 15 from the example above). The strong object tracker 106 can perform lag compensation to compensate for the movement of an object from a first frame (for which the neural network based object detection is applied) to a second frame (at which the results of the neural network detection are available). During the period of detection delay, the one or more objects detected for a given frame may move positions by the time the object detection results are available.

Figure 3B:
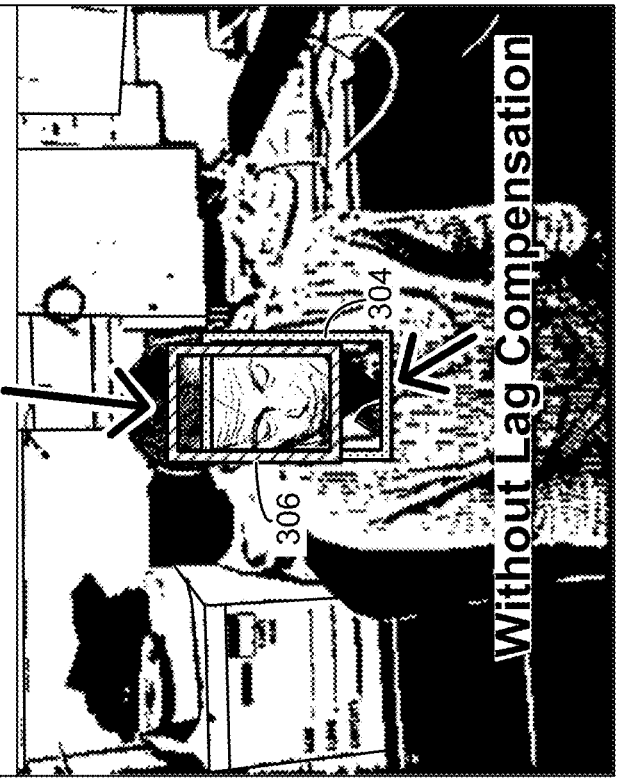
FIG. 3A and FIG. 3B are images illustrating an example of lag compensation, in accordance with some examples.
Figure 3A:
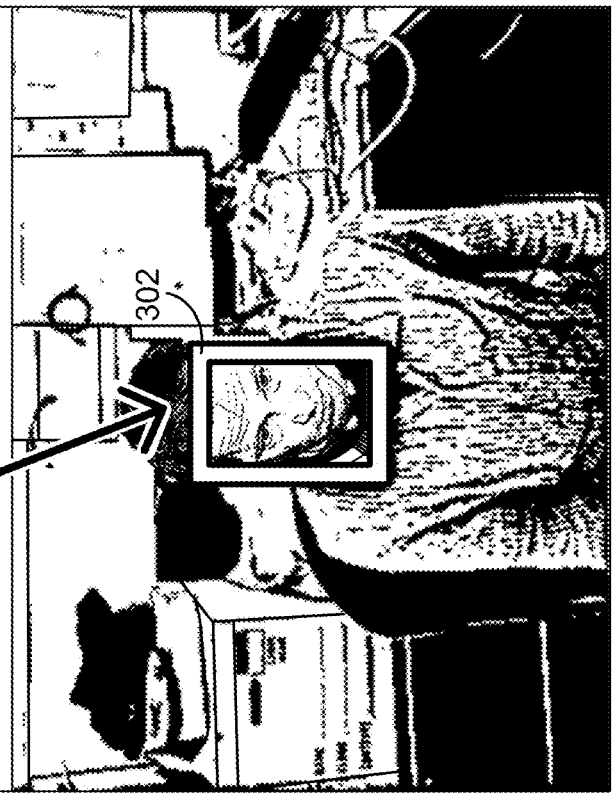

FIG. 3A and FIG. 3B are images illustrating an example of lag compensation performed by the strong object tracker 106. As noted above, the lag compensation includes shifting the bounding boxes for objects from the position where the objects were in a previous frame for which detection was performed to the position where the objects are in a new current frame. As depicted in FIG. 3A, a deep learning based object detection is performed at frame 88 of a video sequence, resulting in the object represented by bounding box 302 being detected. The object in this case is a face, and the object detection results are not ready until the current frame 91.

The strong object tracker 106 can take the bounding box 302 for the face detected in the previous frame 88 and can predict where that bounding box should be in the current frame 91. The strong object tracker 106 can use any suitable object tracking technique to determine an amount by which to shift the bounding box 302 based on the previous frame 88 for which detection was performed and the current frame 91 at which detection results are available. For example, the prediction can be performed using optical flow, KCF, camshift, template matching, Kalman filter, or any other type of tracking technique.

As depicted in FIG. 3B, if the bounding box 302 result were used for tracking the subject's face in frame 91 (without performing lag compensation), a bounding box 304 is produced for tracking the face. As shown, the bounding box 302 is offset from the subject's actual face due to movement of the face between frame 88 and frame 91, which leads to a poor tracking result. By performing lag compensation to generate the bounding box 306, the bounding box 306 accurately tracks the subject's face. For example, lag compensation is performed to predict that the subject's face has moved in an upward and slightly leftward direction. Any of the above-described tracking techniques, or other tracking techniques, can be used to determine the updated location of a bounding box for lag compensation.

Returning to FIG. 2, the shifted results (e.g., the shifted bounding boxes) from the strong object tracker can be output to the lightweight tracker thread 205. The strong tracker thread 207 can then stop at block 236. When the first detection results are available for a video sequence, the shifted results can be used to initialize the lightweight object tracker 108. As noted above, at block 208, the camera thread 201 sends a current frame for tracking to the lightweight tracker thread 205. Once the lightweight object tracker 108 has been initialized (using results from the neural network detection system 104 and the strong object tracker 106, as described above), the lightweight tracker thread 205 can begin tracking one or more objects across video frames of the sequence. For example, at block 220, the lightweight tracker thread 205 begins lightweight tracking, at which point the lightweight object tracker 108 is applied at block 222. In some implementations, the lightweight tracker thread 205 can be run for every frame of the video sequence. In some cases, the lightweight tracker thread 205 can be run for some other number of frames rather than every frame. In any case, the lightweight tracker thread 205 is run more often than the neural network detection thread 203.

The trackers maintained by the lightweight tracker 108 can be updated after the lightweight tracker 108 has been initialized. For example, when new objects are detected by the neural network detection system 104 and the newly detected objects are tracked by the strong object tracker 106, the tracked objects are input (e.g., as bounding boxes) to the lightweight tracker thread 205. At block 234, the lightweight tracker thread 205 can update the tracked objects maintained by the lightweight object tracker 108 and/or can associate (or merge) the newly tracked objects (based on the new object detection results) with the tracked objects currently being maintained by the lightweight object tracker 108. Further details of updating tracked objects (e.g., using a tracking reliability evaluation) and of associating tracked objects from the lightweight object tracker 108 with tracked objects from the strong object tracker 106 are described below.

The lightweight tracker thread 205 can then output the tracking results at block 224, after which the thread 205 is stopped at block 226. For example, image post-processing applications can use the tracked object bounding boxes for processing certain portions of an image to perform various functions, such as autofocus, AAA adjustments, auto exposure, AWB, auto zoom, intelligent motion detection, intrusion detection, and/or other suitable functions. In some cases, the bounding boxes can also be output for display. For example, the bounding boxes can be displayed as surrounding the objects that are being tracked.

Figure 4A:
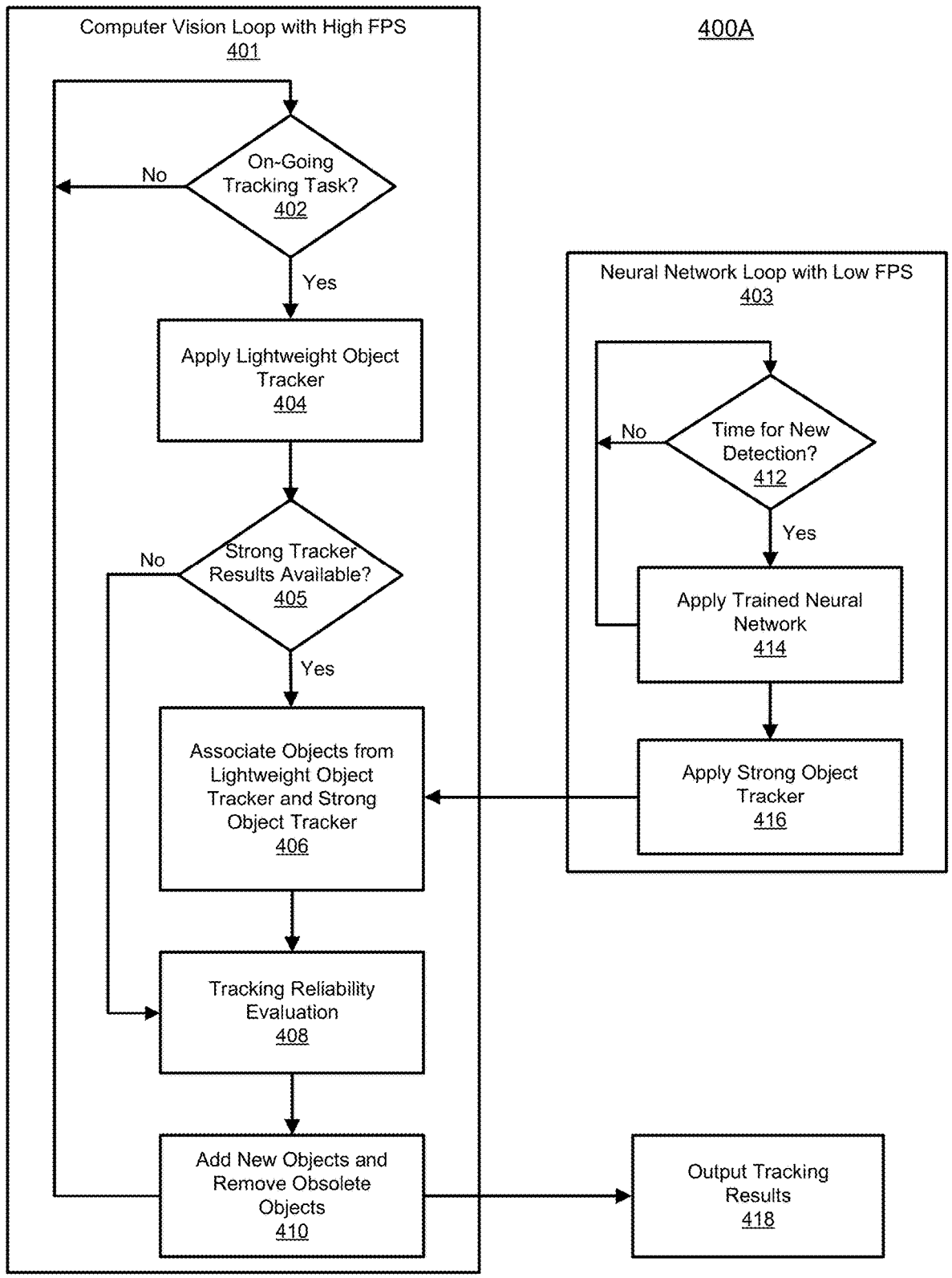
FIG. 4A is a flowchart illustrating an example of an object detection and tracking process, in accordance with some embodiments.

FIG. 4A is a flowchart illustrating an example of an object detection and tracking process 400A. The process 400A includes a computer vision loop 401 operating at a high frame per second (fps), and a neural network loop 403 with a low fps. At block 402, the process 400A includes determining whether there is an on-going tracking task. For example, an on-going tracking task can be present once the lightweight object tracker 108 has been initialized. The lightweight object tracker 108 can be initialized when object detection results are first available from the neural network detection system 104. As noted above, there is a delay from when the neural network detection system 104 starts performing object detection for a current frame to when the results of the object detection for the current frame are available. In one illustrative example that will be used to describe the process 400A, a first frame of a video sequence includes three objects, denoted herein as object 1, object 2, and object 3. When run on the first frame, the neural network detection system 104 detects two of the three objects. For example, objects 1 and 2 two are detected, but not object 3. As previously described, various conditions can prevent the neural network detection system 104 from detecting object 3, such as occlusion, lighting conditions, movement of the object, the size of the object, a combination thereof, and/or other suitable conditions. Based on the complexity of the neural network detection system 104, the object detection results for frame 1 are not available until frame 7. One of ordinary skill will appreciate that the neural network detection system 104 may take a different amount of time to perform detection for different images based on how many objects are in the image and the complexity of the scenes in the images (e.g., lighting, object movement, shadows, occlusions, among other conditions).

Continuing with the above example, once the detection results of object 1 and object 2 are available at frame 7, the detection results are passed to the strong object tracker 106. The strong object tracker 106 shifts the two bounding boxes for objects 1 and 2 to the estimated positions of the objects 1 and 2 in frame 7. For example, frame 1 and frame 7 are compared using a tracking technique (e.g., template matching, KCF, camshift, Kalman filter, or any other type of tracking technique) to determine a predicted position in frame 7 for the bounding boxes associated with object 1 and object 2. The shifted results are then used to initialize the lightweight object tracker 108. Once initialized, the lightweight object tracker 108 has two objects to track from frame 7 onward, until new object detection results are available. In some cases, when the lightweight object tracker 108 is initialized, the thumbnails of the shifted bounding boxes in frame 7 are captured and saved (e.g., stored in memory). A thumbnail captured for an object in a frame for which object detection is performed is referred to herein as a "detection thumbnail." As described in more detail below, the detection thumbnails can be used in the tracking reliability evaluation performed at block 408. For example, a thumbnail captured for an object in subsequent frame in which the object is tracked (using the lightweight object tracker 108) can be compared to a detection thumbnail captured for the object in a frame for which object detection was performed. It is noted that thumbnails of the original detected bounding boxes (in frame 1) are not saved because the they are off for computing reliability metrics (e.g., correlation, variance, standard deviation, feature point matching strength to indicate how many feature points successfully matched between the two thumbnails, Intersection-over-Union (IOU) scores, and/or any other suitable reliability metric).

The process 400A can determine there is an on-going tracking task at block 402 once the lightweight object tracker 108 has been initialized. If the lightweight object tracker 108 has not yet been initialized (e.g., there are no detection results available yet for a video sequence), block 402 determines that there is no on-going tracking task for a current frame. Block 402 checks again for an on-going tracking task at a next frame.

If an on-going tracking task is determined to be on-going for a current frame at block 402, the lightweight object tracker 108 is applied for the current frame at block 404. For instance, continuing with the example from above, the lightweight object tracker 108 can track object 1 and object 2 in frame 8. For example, when frame 8 is obtained for processing by the object detection and tracking system 102, the lightweight object tracker 108 predicts where object 1 and object 2 are in frame 8 based on the bounding boxes of objects 1 and 2 from frame 7. In one illustrative example, the lightweight object tracker 108 can use optical flow to predict the locations of object 1 and object 2 in frame 8. One of ordinary skill will appreciate that the lightweight object tracker 108 can use any other suitable tracking technique.

At block 405, the process 400A determines whether strong tracker results are available for a current frame. For example, strong tracker results are available in a frame when object detection results are available for that frame and the strong object tracker 106 performs lag compensation for the objects in the object detection results. If it is determined, at block 405, that strong tracker results are not available for a current frame, tracking reliability evaluation is performed at block 408 for the objects currently being tracked by the lightweight object tracker 108. The tracking reliability evaluation can be used by the lightweight object tracker 108 to determine whether to continue to maintain tracked objects or to remove a tracked object for continued tracking for a video sequence. Reliability metrics (e.g., correlation, variance, standard deviation, or other suitable reliability metric) between a current frame and the frame at which object detection results were available (and the strong object tracker 106 was performed) can be used in the tracking reliability evaluation.

In each frame, thumbnails of the bounding boxes associated with tracked objects can be captured and compared to detection thumbnails of the objects to determine the reliability metrics used in the tracking reliability evaluation. A thumbnail of a bounding box can include a captured image of a region of a frame encompassed by the bounding box. Continuing with the example from above, thumbnails of the bounding boxes predicted by the lightweight object tracker 108 for the objects 1 and 2 in frame 8 can be compared to the detection thumbnails of the respective bounding boxes that were captured and saved for frame 7 (which is the last frame object detection results were available and the strong object tracker 106 was performed). For example, a thumbnail of the bounding box predicted for object 1 in frame 8 can be compared to the detection thumbnail of the detected (and shifted) bounding box for object 1 captured in frame 7 to determine a reliability metric between the bounding boxes. Similarly, a thumbnail of the bounding box predicted for object 2 in frame 8 can be compared to the detection thumbnail of the detected (and shifted) bounding box for object 2 in frame 7. In one illustrative example, the reliability metric can include a correlation. For example, if the thumbnail image of a bounding box captured for object 1 in frame 8 matches well with the "detected thumbnail" image of the bounding box captured for object 1 in frame 7, the bounding boxes are considered to have strong correlation, and will be kept for tracking in the current frame and possibly for subsequent frames. If the bounding box thumbnails do not match well, the bounding box for object 1 is dropped in the current frame (frame 8) and the corresponding tracked object is not tracked any further.

The quality of the match between object bounding boxes of two frames can be based on a quality threshold. For example, the quality threshold can include a threshold correlation when correlation is used as the reliability metric. Using the example from above, the thumbnail of the bounding box predicted for object 1 in frame 8 can be compared to the detection thumbnail of the detected (and shifted) bounding box for object 1 in frame 7 to determine a correlation score between the two bounding boxes. A correlation score (also referred to as a correlation coefficient) can have a value in the range of −1 to 1, inclusive. A correlation score is a number that quantifies some type of correlation and dependence, meaning statistical relationships between two or more random variables or observed data values. In one illustrative example, the correlation (co) can be defined as co=COV(X,Y)/Sqrt(COV(X,X)*COV(Y, Y)). The covariance COV(X,X) is the variance of X (denoted as VAR(X)), and the covariance COV(Y,Y) is the variance of Y (denoted as VAR(Y)). The covariance of X and Y is defined as COV(X,Y)=E((X−E(X))(Y−E(Y))). E(X) is the expectation of X (or average of X), E(Y) is the expectation of Y (or average of Y). For example, a high correlation score between thumbnails indicates that the pixels of one of the thumbnails should be statistically similar (e.g., linearly or other statistical relationship) to the pixels of the other thumbnail. In some cases, Normalized Cross Correlation (NCC) can be used, in which case the pixels can first be made to have zero mean and a variance of 1. The correlation can then be computed as specified above.

The correlation score can then be compared to a threshold correlation that includes a minimum correlation amount. If the correlation between the bounding boxes in frame 8 and frame 7 for object 1 is above the minimum correlation amount, the object will continue to be tracked using the bounding box. However, if the correlation between the bounding boxes for object 1 in frame 8 and frame 7 is below the minimum correlation amount, the bounding box can be dropped and object 1 will not be tracked in the current frame or in subsequent frames. The tracking reliability evaluation can be performed for each tracked object in the current frame. For example, a similar analysis can be performed for the thumbnails of the bounding boxes for object 2 in frame 7 and frame 8.

As previously discussed, the neural network detection system 104 may only perform object detection using a trained neural network for one current frame at a time, which can take several frames to complete. While object detection is performed for a current frame using the trained neural network, object detection for other frames cannot be performed until detection results are available for the current frame. At block 412, the process 400A determines whether it is time for a new detection by the neural network detection system 104. If it is determined at block 412 that it is time for a new detection at a new current frame, the process 400A applies the trained neural network to the new current frame. If it is determined that it is not time for a new detection for a current frame at block 412, the process 400A can determine whether it is time for a new detection again for a next frame when the next frame is obtained.

In the example from above, object detection results for frame 1 became available at frame 7, in which case object detection using the neural network detection system 104 was unavailable for frames 2-6. In such an example, when each of frames 2-6 are obtained, the process 400A can determine at block 412 that it is not time for a new detection. When frame 8 is obtained, the process 400A can determine that it is time for a new detection at frame 8 due to the neural network detection system 104 being free. At block 414, the trained neural network can be applied to frame 8 by the neural network detection system 104. However, again due to the delay from when the trained neural network is applied to when the detection results are available, the detection results for frame 8 are not available until a subsequent frame, such as frame 15 for example. Continuing with the above example, the object detection performed for frame 8 can result in all three objects being detected, including object 1, object 2, and object 3. Various conditions may have changed from frame 1 to frame 8, which allow the neural network detection system 104 to detect object 3 in frame 8, but which previously prevented the detection of object 3. For example, an occlusion that previously occluded object 3 may not be present in frame 8, allowing the neural network detection system 104 to accurately detect object 3. In another example, the object 3 (which may include a person or a face of a person), may move closer to the camera by the time frame 8 is captured, in which case the object may be larger, allowing the neural network detection system 104 to properly detect object 3. In another example, the object 3 may be more still in frame 8 than it was in frame 1. Other conditions may have also changed from frame 1 to frame 8 that increase the accuracy of the neural network detection system 104.

At block 416, the strong object tracker 106 is applied to the detection results from the neural network detection system 104. For example, the strong object tracker 106 can shift the locations of the bounding boxes for object 1, object 2, and object 3 to compensate for the movement of the objects during the time the object detection is performed. For example, the strong object tracker 106 can predict where a bounding box for object 3 detected in the previous frame 8 should be located in the current frame 15. The strong object tracker 106 can use any suitable object tracking technique to determine by how much to shift the bounding box 302 based on information in frame 8 and information in frame 15. Examples of tracking techniques that can be used by the strong object tracker 106 include optical flow, KCF, camshift, template matching, Kalman filter, a combination thereof, or any other type of tracking technique.

The shifted bounding boxes (shifted by the strong object tracker 106) for a current frame (e.g., frame 15 in the example from above) are then provided to the lightweight object tracker 108 for tracking. For example, when block 405 is performed for the current frame, the process 400A can determine that strong tracker results are available, and can perform the steps of block 406 for the current frame. At block 406, the process 400A associates objects already being tracked by the lightweight object tracker 108 for the current frame (based on object detection and strong object tracker results from previous frames, such as for frame 1) with the objects tracked using the strong object tracker 106 for the current frame. For example, the lightweight object tracker 108 can compare each bounding box it receives from the strong object tracker 106 for the current frame with the bounding boxes it is already tracking for the current frame.

Objects that are already being tracked by the lightweight object tracker 108 can be compared to the detection and tracking results received from the strong object tracker 106 to determine whether to keep the bounding boxes currently being used to track the objects or to replace the current bounding boxes with the results from the strong object tracker 106. In the example from above, object 1 and object 2 are already being tracked by the lightweight object tracker 108, while object 3 is a newly tracked object from the strong object tracker 106. Because object 3 is not currently being tracked by the lightweight object tracker 108 (due to object 3 not previously being detected in frame 1), the lightweight object tracker 108 adds, at block 410, object 3 and the associated bounding box to its list of tracked objects. The lightweight object tracker 108 can also save the "detection thumbnail" for the object 3 in order to perform the tracking reliability evaluation for object 3 in subsequent frames.

For object 1 and object 2, the lightweight object tracker 108 can compare detection confidence levels (or scores) of the bounding boxes currently being used to track the objects with the confidence levels of the bounding boxes just received from the strong object tracker 106. For example, as described herein, the trained neural network applied by the neural network detection system 104 can generate a class (or category) and a confidence level (or score) for a detected object. The confidence level can include number (e.g., between 0-1) that indicates the confidence the detector is that the object includes the determined class. For example, a high confidence level (e.g., 0.80, 0.85, 0.90, 0.95, or other high score) that an object includes a "person" class can indicate a high likelihood that the object is in fact a person. The confidence levels of the bounding boxes currently being used to track the objects can be the confidence levels determined from the previous detection result. If the confidence level of the bounding box of an object received from the strong object tracker 106 is lower than the confidence level of the bounding box currently being used to track the object (block 406) and the reliability metric score (e.g., correlation score) of the bounding box currently being used to track the object is higher than the quality threshold (block 408), the lightweight object tracker 108 does not replace (at block 410) the tracked bounding box with the bounding box it just received from the strong object tracker 106. However, if the confidence level of the bounding box of the object received from the strong object tracker 106 is higher than the confidence level of the bounding box currently being used to track the object, or if the correlation score of the bounding box currently being used to track the object is lower than the quality threshold, the lightweight object tracker 108 replaces (at block 410) the current tracked bounding box for the object with the newly received bounding box and saves a new "detection thumbnail" for the object based on the newly received bounding box, which can be used compute the reliability metric (e.g., correlation) for future frames.

In some cases, the neural network detection system 104 may not detect, in a current frame, an object that was previously detected in a previous frame. Using the example from above, the neural network detection system 104 may detect object 2 and object 3 in frame 16, but may not detect object 1. In such cases, the lightweight object tracker 108 can continue to track object 1 in subsequent frames, as long as the reliability metric at each frame is above the quality threshold.

At block 418, the process 400A can output the tracking results. For example, as described above, image post-processing applications can use the tracked object bounding boxes for processing the regions of the current frame to provide various functions, such as autofocus, AAA adjustments, auto exposure, AWB, auto zoom, intelligent motion detection, intrusion detection, and/or other suitable functions. The bounding boxes can also be output for display in some cases. For example, the bounding boxes can be displayed as surrounding the objects that are being tracked.

Using the above-described object detection and tracking techniques, advanced and complex neural networks, including deep networks, can be effectively used for a variety of image based tasks on mobile devices or other suitable devices. With the aid of multiple trackers (e.g., the lightweight and strong trackers), the latency associated with such neural networks is nullified without losing accuracy or speed. In addition, the multi-threaded approach allows for power usage control. For instance, based on the task, efficiency (speed) vs. effectiveness (accuracy) of the system can be balanced. In one example of balancing efficiency vs. effectiveness, the frame rate at which the neural network is applied can be made lower (increasing effectiveness and decreasing speed), if needed, in order to save energy and bus bandwidth, thanks to the lag compensation that allows real-time performance to be achieved even in view of the delay in obtaining detection results. Such flexibility in the detection and tracking system operation helps to keeps a high quality user experience going with the high fps tracking, while hiding the frame rate fluctuations of the neural network based object detection.

In some examples, the object detection and tracking system 102 can include a static buffer (not shown) for object tracking and a dynamic buffer for object detection and classification. Because an image buffer stores an entire image or a portion of an image for processing, the term "buffer" or "image buffer," as used herein, can be used interchangeably with the term "image." The object tracking buffer is referred to as a static buffer because the buffer size and offset (location) are not changed from frame to frame. For example, the size of the image used for object tracking can remain static. In one illustrative example, an entire video frame can be used for object tracking, instead of a cropped portion of each video frame. The object detection and classification buffer is referred to as a dynamic buffer because the buffer offset (location) and size can be changed from frame to frame. For example, the size of the image processed by the neural network detection system 104 can vary from frame to frame. In one illustrative example, an entire portion of a first video frame can be processed by the neural network detection system 104 for object detection and classification, and a cropped portion of a second video frame (that is subsequent to the first video frame in a video sequence) can be processed by the neural network detection system 104 for a next iteration of the object detection and classification. The portion of each video frame that is used can be dynamically changed at each iteration of the neural network detection system 104.

Figure 4B:
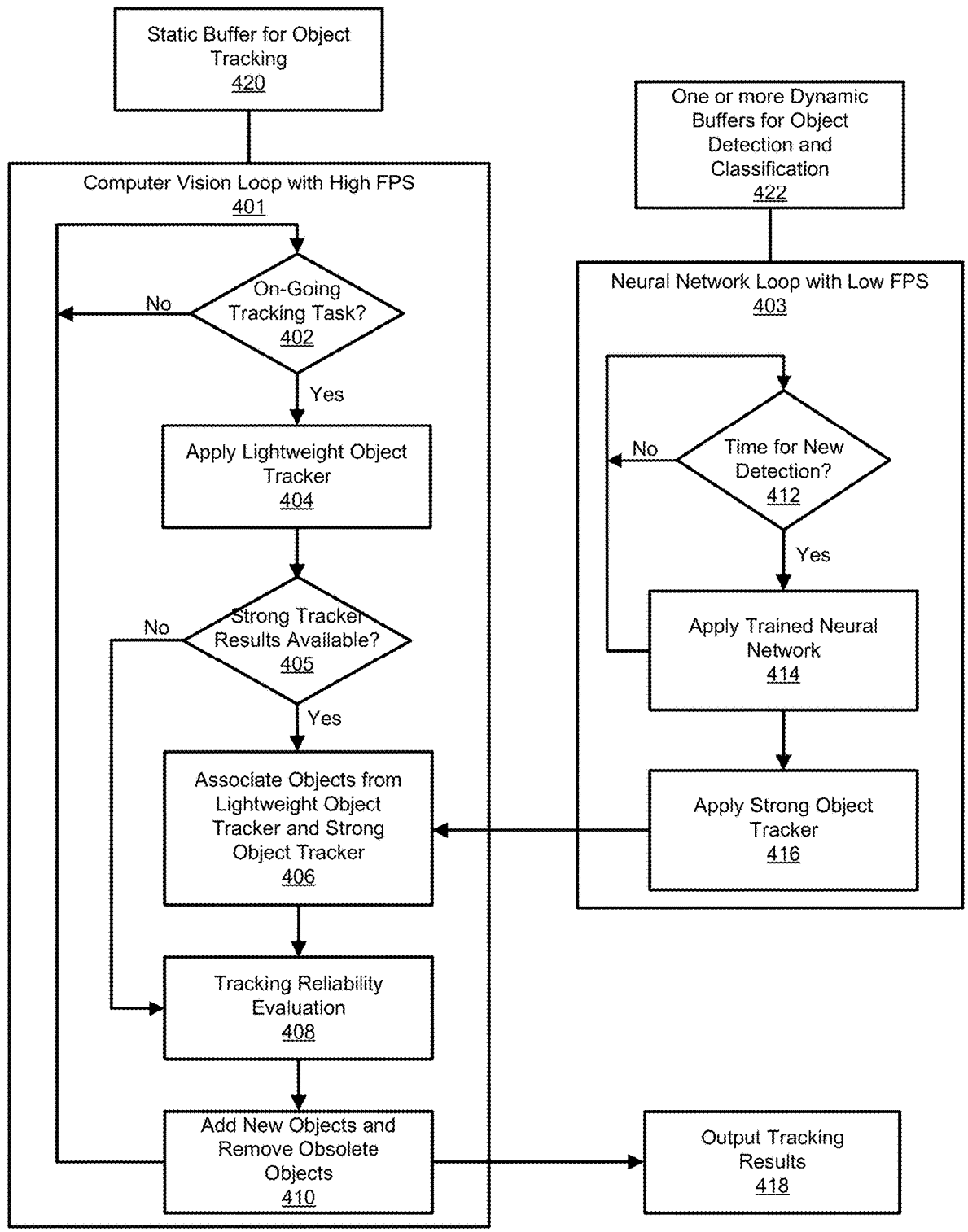
FIG. 4B is a flowchart illustrating an example of an object detection and tracking process using buffers for object tracking and for object detection and classification, in accordance with some embodiments.

FIG. 4B is a flowchart illustrating an example of an object detection and tracking process 400B where a static buffer 420 is used for object tracking and one or more dynamic buffers 422 are used for object detection and classification. The steps of the process 400B are the same as the process 400A, except that the static buffer 420 and the one or more dynamic buffers 422 are used in the process 400B. In some cases, the static buffer 420 for object tracking can be the same size as the input image buffer. For example, as noted above, the size of the image used for object tracking can remain static. In one illustrative example, an entire video frame can be used for object tracking. In some cases, the one or more dynamic buffers 422 for object detection and classification are smaller in size than the input image buffer. In one illustrative example, the static buffer 420 for object tracking is the same size as the input image buffer (the entire portion of a video frame), while a dynamic buffer (from the one or more dynamic buffers 422) is the same size or is less in size than the input image buffer, depending on which iteration of the object detection and classification the neural network detection system 104 is performing. In some examples, the dynamic buffer (from the one or more dynamic buffers 422) is in a quarter size of the input image buffer (as shown in FIG. 4C).

Figure 4C:
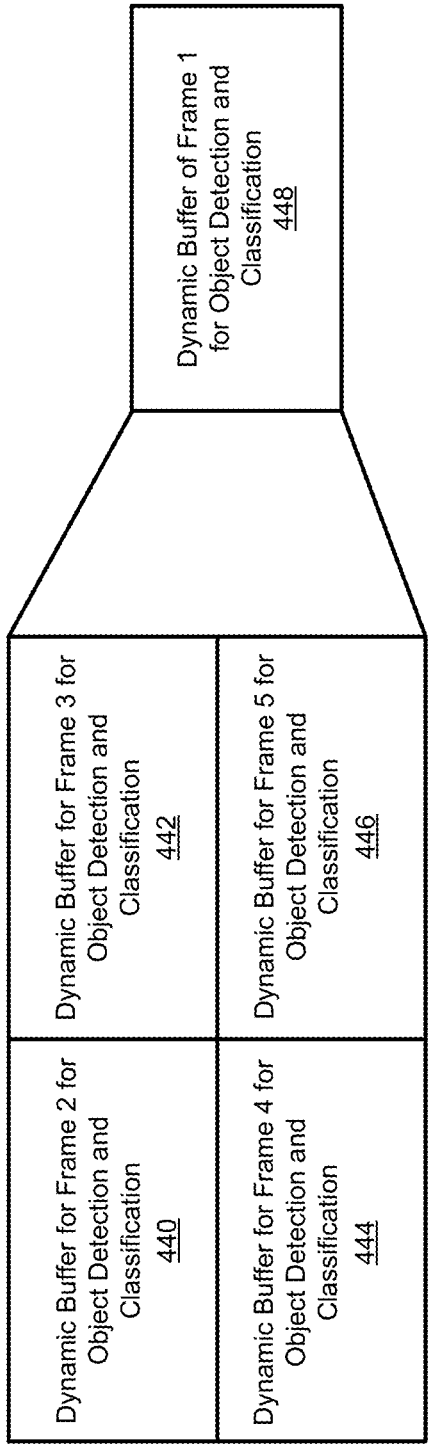
FIG. 4C is a diagram illustrating an example of dynamic buffers for object detection and classification, in accordance with some embodiments.

FIG. 4C is a diagram illustrating an example of the one or more dynamic buffers 422 for the object detection and classification. As noted above, a dynamic buffer (from the one or more dynamic buffers 422) can be a quarter size of the input image buffer in some examples. For instance, in some cases, the object detection and classification can be done in a loop of five frames, in which case object detection and classification is performed five times (one time at each of the five frames). For example, as shown in FIG. 4C, the dynamic buffer 448 of a first frame (frame 1) can be made to match a down-scaled buffer of the entire input image, the dynamic buffer 440 of a second frame (frame 2) can be made to match one quarter of the input image buffer in the same scale, the dynamic buffer 442 of a third frame (frame 3) can be made to match a second quarter of the input image buffer in the same scale, the dynamic buffer 444 of a fourth frame (frame 4) can be made to match a third quarter of the input image buffer in the same scale, and the dynamic buffer 446 of a fifth frame (frame 5) can be made to match a fourth quarter of the input image buffer in the same scale. Objects can then be detected and classified with down-scaling in frame 1 and with original-scaling in frames 2 to 5. After 5 frames are processed, the loop of 5 frames can repeat.

The frames 1-5 may not be consecutive in the video sequence, based on the rate of the object detection and classification. In one illustrative example, the rate of the object detection and classification may be every five frames, in which case the neural network detection system 104 can finish performing object detection and classification every five frames of a video sequence. In such an example, the first frame (frame 1) can be a first frame of the video sequence, the second frame (frame 2) can be a sixth frame of the video sequence, the third frame (frame 3) can be an eleventh frame of the video sequence, the fourth frame (frame 4) can be a sixteenth frame of the video sequence, and the fifth frame (frame 5) can be a twenty-first frame of the video sequence. One of ordinary skill will appreciate that the object detection and classification may take varying amounts of time for each video frame of a video sequence, which can depend on various factors, such as a number of objects detected, a complexity of a scene, lighting conditions, resolution of a video frame, any combination thereof, and/or other suitable factors.

In some cases, a full video frame can be fed into the neural network detection system 104 more often than the example provided above, in order to allow the lightweight object tracker 108 to maintain confidence that it is tracking relevant objects that are still in a scene being captured by a video sequence. In one illustrative example, a full video frame can be fed as input to the neural network detection system 104 every other iteration of the object detection and classification. For instance, the dynamic buffer of a first video frame (frame 1) can be made to match a down-scaled buffer of the entire input image, in which case the entire portion of the first frame is used for object detection and classification at a first iteration of the object detection and classification. The first frame can include a first frame of a video sequence. At a second iteration of the neural network detection system 104, only a cropped portion of a second video frame (frame 2) can be used for object detection and classification, in which case the dynamic buffer of the second frame (frame 2) can be made to match the cropped size of the input image buffer in the same scale. The second frame can include a sixth frame of the video sequence. At a third iteration of the neural network detection system 104, entire portion of a third video frame (frame 3) can be used for object detection and classification at a third iteration of the object detection and classification, in which case the dynamic buffer of the third video frame can be made to match a down-scaled buffer of the entire input image. The third frame can include an eleventh frame of the video sequence. At a fourth iteration of the neural network detection system 104, a cropped portion of a fourth video frame (frame 4) can be used for object detection and classification. The fourth frame can include a sixteenth frame of the video sequence. One of ordinary skill will appreciate that a full frame can be fed into the neural network detection system 104 at any other rate, depending on desired settings of the object detection and tracking system 102.

Having two sizes of buffers has many advantages. For example, a smaller working buffer (and thus smaller images corresponding to cropped portions of video frames) can be used by the neural network detection system 104 for object detection, while a larger buffer (and thus larger images corresponding to entire video frames or other large portions of video frames) can be used for tracking. Further, the object detection buffer can be a portion of the input image buffer and/or a down-scaled buffer. Such a system provides greater control over detection and tracking at distances. For example, using the buffers shown in FIG. 4B and FIG. 4C, the object detection and tracking system 102 can perform high-fps detection and tracking of small objects. Small objects can be detected and/or classified using the dynamic buffer due to cropped portions of video frames being used for the detection and classification. For example, object detection and classification can be more accurate when an input image includes larger objects. Cropping an entire video frame to include a cropped region can effectively provide larger objects to the neural network detection system 104. For example, an object that is small in an entire video frame becomes large when a portion of the video frame that includes the object is cropped, and the cropped image is provided to the neural network detection system 104.

In some examples, the static buffer for object tracking can have the same size as the input image buffer, while the scale, size, and offset (location) of the one or more dynamic buffers for object detection and classification can be dynamically determined. The size defines the size of a cropped region from a video frame (and thus the size of the dynamic buffer for the video frame). For instance, in the example of FIG. 4C, the size of a cropped region from an input video frame is ¼ of the input video frame. The size of a cropped region can be any suitable size for a given video frame. For example, in some implementations, instead of cropping ¼ of a video frame, an nxn patch can be cropped from a video frame. In some cases, the size of a cropped region can be dynamically determined, such as based on feedback from tracking (e.g., a region of interest), as described below.

The scale defines by how much a size of a cropped area needs to be adjusted before being fed into the neural network detection system 104. For example, the neural network detection system 104 may only accept as input a fixed image size, such as an image have a size of W×W. As one illustrative example, the fixed size W×W can be a size of 240 pixels×240 pixels. In such an example, if the size of a cropped region from an input video frame is 100 pixels×100 pixels, the cropped region will be upscaled to a size of 240 pixels×240 pixels. In some cases, the size of a cropped region can include a same size as the fixed size W×W, in which case scaling is not needed. In other cases, the size of a cropped region can be made to be smaller than the fixed size W×W, in order to allow accurate detection and/or classification of smaller objects.

The offset defines the offset from a point in the original video frame at which a cropped region from the video frame is located. For example, if a top-left coordinate of a region cropped from a video frame is located at an (x, y) pixel coordinate of (44, 44), the offset can be set to (44, 44). The offset can be used when transforming from the entire input video frame to a cropped region from the video frame, which is performed to generate the input image (corresponding to the cropped portion from the video frame) for the neural network detection system 104. The offset can also be used to transform back from the cropped region to the entire video frame before providing the video frame as input for object tracking (e.g., by the lightweight object tracker 108 and/or the strong object tracker 106).

In some cases, the scale, size, and offset (location) of the one or more dynamic buffers for object detection and classification can be dynamically determined according to a region of interest (ROI). The ROI can be determined using different techniques. In one illustrative example, a ROI in a video frame can be determined based on feedback from object tracking indicating bounding boxes of tracked objects, a zone where potential objects will show up, a zone where a moving foreground blob is detected, a zone where one or more previous objects disappeared, a zone with an interesting region defined by a particular application, and/or using any other suitable technique. For example, an ROI corresponding to a bounding box of a tracked object can be used to determine a region from a video frame to use for object detection and classification. In such an example, the bounding box itself, or a region surrounding the bounding box, can be used as the region that will be cropped from an input video frame.

Figure 4D:
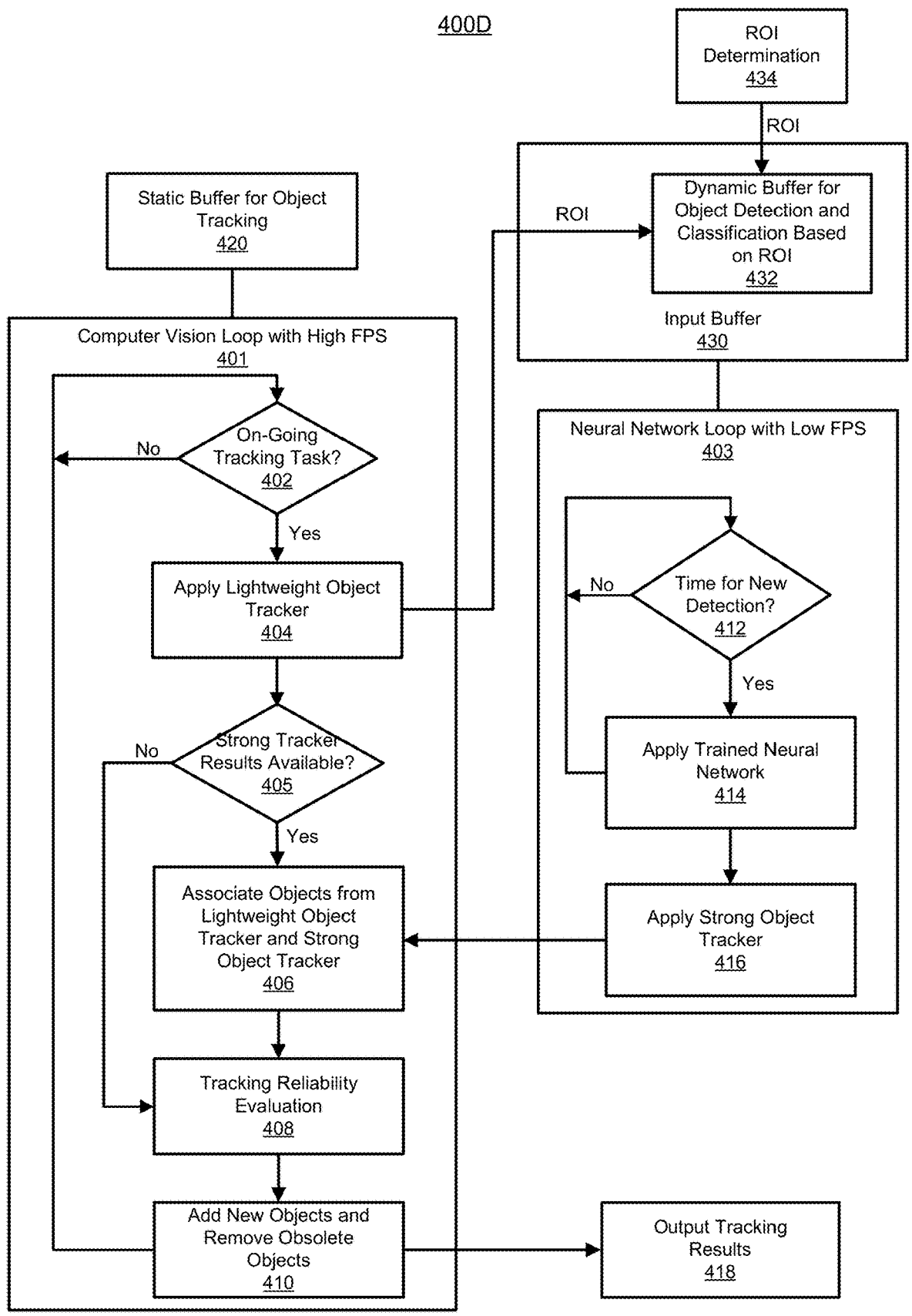
FIG. 4D is a flowchart illustrating another example of an object detection and tracking process using buffers for object tracking and for object detection and classification, in accordance with some embodiments.

FIG. 4D is a flowchart illustrating an example of an object detection and tracking process 400D where the static buffer 420 is used for object tracking and an input buffer 430 is used for object detection and classification. The steps of the process 400D are the same as the process 400A, except that the static buffer 420 and the input buffer 430 is used in the process 400D. The input buffer 430 includes a dynamic buffer 432 for object detection and classification. The scale, size, and offset (location within the frame) can be determined based on an ROI determined for the frame during an ROI determination step 434. As shown in FIG. 4D, feedback from application of the lightweight object tracker at step 404 can be sent to the dynamic buffer 432, which can include ROI information related to the tracked object. For example, a region around one or more ROIs associated with one or more tracked objects can be used to determine a region to crop from an input video frame.

As described above, having two sizes of buffers, with the dynamic buffer being based on ROI, has many advantages. For example, scaling factor and location of the smaller working buffer (the dynamic buffer) used by the neural network detection system 104 for object detection can be based on feedback from the lightweight object tracker 108 (or the strong object tracker 106), or based on other information. A larger buffer can also be used for tracking. Such a system also provides greater control over detection and tracking at distances, as noted above. For example, using the buffers shown in FIG. 4D, the object detection and tracking system 102 can perform high-fps detection and tracking of small objects at far distances.

In some examples, using pre-defined dynamic buffer sizes (e.g., ¼ of image buffer size) and using ROI-based dynamic buffer sizes can be combined to generate a dynamic buffer for object detection and classification. The static buffer for object tracking can be the same size of the input image buffer or in a fixed size and down-scaled from the input image buffer. When passing object location and size from the dynamic buffer of object detection and classification to the static buffer of object tracking, the scaling factor and offset between the dynamic buffer (the cropped region from an input video frame) and the static buffer (the entire input video frame) need to be included in order to convert between the cropped region and the entire video frame. The objects detected and classified by the neural network detection system 104 can then be mapped correctly from the dynamic buffer (the cropped region) to the static buffer (the entire input video frame).

As described above, various neural network-based detectors can be used by the neural network detection system 104. Illustrative examples of deep neural networks include a convolutional neural network (CNN), an autoencoder, a deep belief net (DBN), a Recurrent Neural Networks (RNN), or any other suitable neural network. In one illustrative example, a deep neural network based detector applied by the neural network detection system 104 can include a deep network based detector, such as a single-shot detector (SSD) (as described below with respect to FIG. 7A-FIG. 7C), a YOLO detector (as described below with respect to FIG. 8A-FIG. 8C), or other suitable detector that operates using a complex neural network.

Figure 5:
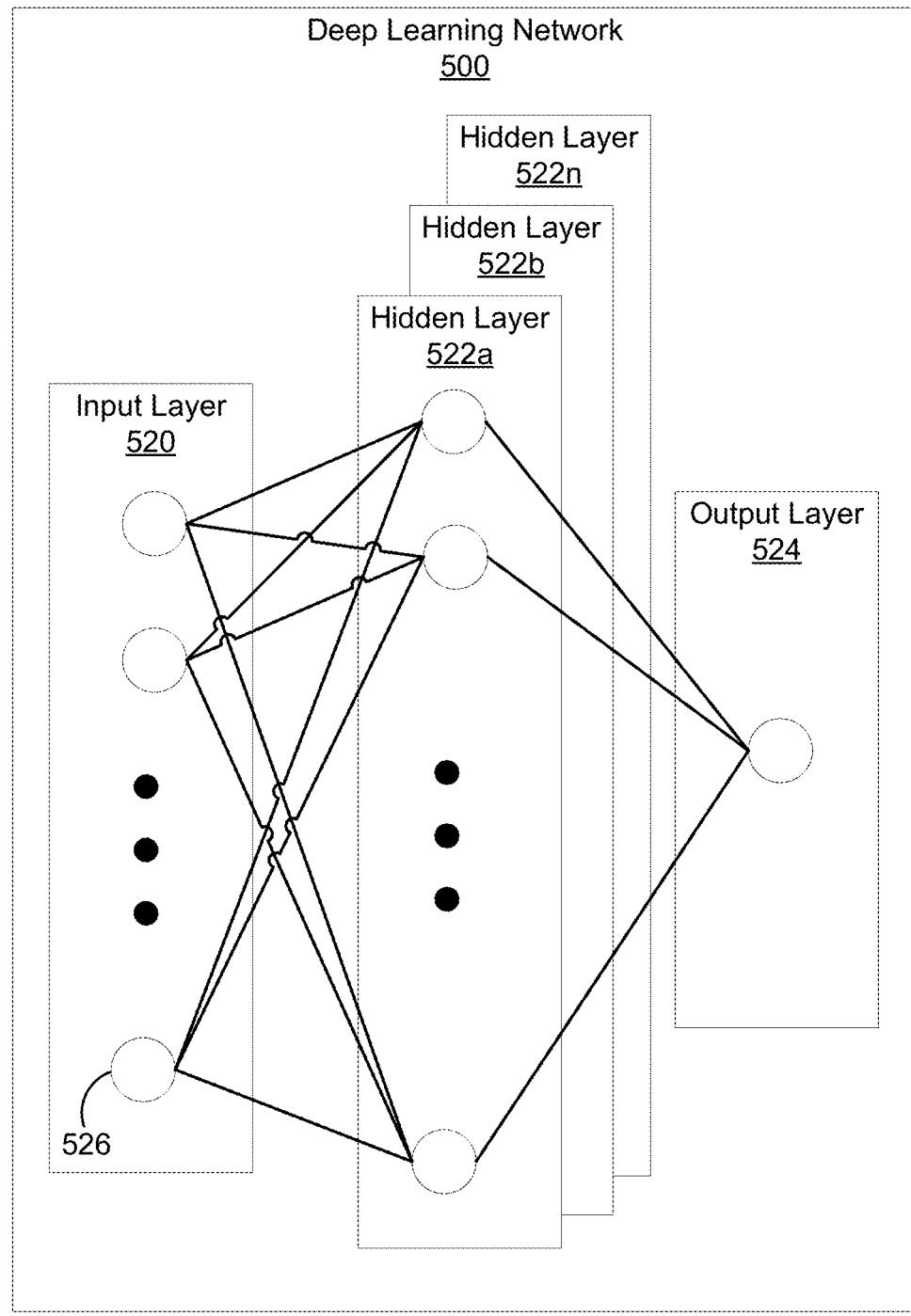
FIG. 5 is a block diagram illustrating an example of a deep learning network, in accordance with some examples.

FIG. 5 is an illustrative example of a deep learning neural network 500 that can be used by the neural network detection system 104. An input layer 520 includes input data. In one illustrative example, the input layer 520 can include data representing the pixels of an input video frame. The deep learning network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The deep learning network 500 further includes an output layer 524 that provides an output resulting from the processing performed by the hidden layers 522a, 522b, through 522n. In one illustrative example, the output layer 524 can provide a classification and/or a localization for an object in an input video frame. The classification can include a class identifying the type of object (e.g., a person, a dog, a cat, or other object) and the localization can include a bounding box indicating the location of the object.

The deep learning network 500 is a multi-layer neural network of interconnected nodes. Each node can represent a piece of information. Information associated with the nodes is shared among the different layers and each layer retains information as information is processed. In some cases, the deep learning network 500 can include a feed-forward network, in which case there are no feedback connections where outputs of the network are fed back into itself. In some cases, the network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the hidden layers 522a-n can transform the information of each input node by applying activation functions to these information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 524, at which an output is provided. In some cases, while nodes (e.g., node 526) in the deep learning network 500 are shown as having multiple output lines, a node has a single output and all lines shown as being output from a node represent the same output value.

In some cases, each node or interconnection between nodes can have a weight that is a set of parameters derived from the training of the deep learning network 500. For example, an interconnection between nodes can represent a piece of information learned about the interconnected nodes. The interconnection can have a tunable numeric weight that can be tuned (e.g., based on a training dataset), allowing the deep learning network 500 to be adaptive to inputs and able to learn as more and more data is processed.

The deep learning network 500 is pre-trained to process the features from the data in the input layer 520 using the different hidden layers 522a, 522b, through 522n in order to provide the output through the output layer 524. In an example in which the deep learning network 500 is used to identify objects in images, the network 500 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep neural network 500 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 500 is trained well enough so that the weights of the layers are accurately tuned.

For the example of identifying objects in images, the forward pass can include passing a training image through the network 500. The weights are initially randomized before the deep neural network 500 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 500, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 500 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 500 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning network 500 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 500 can include any other deep network other than a CNN, such as an autoencoder, a deep belief nets (DBNs), a Recurrent Neural Networks (RNNs), among others.

Figure 6:
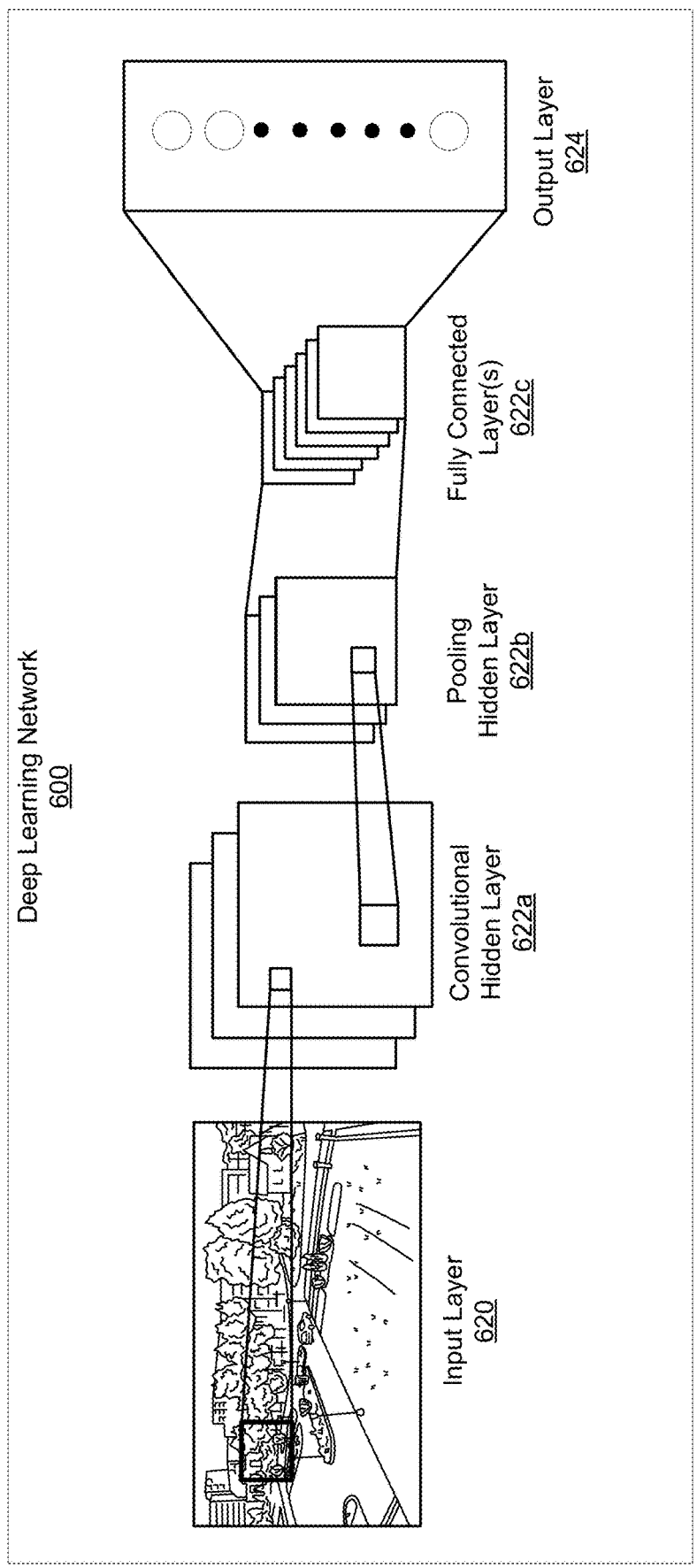
FIG. 6 is a block diagram illustrating an example of a convolutional neural network, in accordance with some examples.

FIG. 6 is an illustrative example of a convolutional neural network 600 (CNN 600). The input layer 620 of the CNN 600 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 622a, an optional non-linear activation layer, a pooling hidden layer 622b, and fully connected hidden layers 622c to get an output at the output layer 624. While only one of each hidden layer is shown in FIG. 6, one of ordinary skill will appreciate that multiple convolutional hidden layers, non-linear layers, pooling hidden layers, and/or fully connected layers can be included in the CNN 600. As previously described, the output can indicate a single class of an object or can include a probability of classes that best describe the object in the image.

The first layer of the CNN 600 is the convolutional hidden layer 622a. The convolutional hidden layer 622a analyzes the image data of the input layer 620. Each node of the convolutional hidden layer 622a is connected to a region of nodes (pixels) of the input image called a receptive field. The convolutional hidden layer 622a can be considered as one or more filters (each filter corresponding to a different activation or feature map), with each convolutional iteration of a filter being a node or neuron of the convolutional hidden layer 622a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 622a. Each connection between a node and a receptive field for that node learns a weight and, in some cases, an overall bias such that each node learns to analyze its particular local receptive field in the input image. Each node of the hidden layer 622a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 622a is due to each node of the convolutional layer being applied to its corresponding receptive field. For example, a filter of the convolutional hidden layer 622a can begin in the top-left corner of the input image array and can convolve around the input image. As noted above, each convolutional iteration of the filter can be considered a node or neuron of the convolutional hidden layer 622a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 622a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 622a.

The mapping from the input layer to the convolutional hidden layer 622a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 622a can include several activation maps in order to identify multiple features in an image. The example shown in FIG. 6 includes three activation maps. Using three activation maps, the convolutional hidden layer 622a can detect three different kinds of features, with each feature being detectable across the entire image.

In some examples, a non-linear hidden layer can be applied after the convolutional hidden layer 622a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 600 without affecting the receptive fields of the convolutional hidden layer 622a.

The pooling hidden layer 622b can be applied after the convolutional hidden layer 622a (and after the non-linear hidden layer when used). The pooling hidden layer 622b is used to simplify the information in the output from the convolutional hidden layer 622a. For example, the pooling hidden layer 622b can take each activation map output from the convolutional hidden layer 622a and generates a condensed activation map (or feature map) using a pooling function. Max-pooling is one example of a function performed by a pooling hidden layer. Other forms of pooling functions be used by the pooling hidden layer 622a, such as average pooling, L2-norm pooling, or other suitable pooling functions. A pooling function (e.g., a max-pooling filter, an L2-norm filter, or other suitable pooling filter) is applied to each activation map included in the convolutional hidden layer 622a. In the example shown in FIG. 6, three pooling filters are used for the three activation maps in the convolutional hidden layer 622a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 622a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 622a having a dimension of 24×24 nodes, the output from the pooling hidden layer 622b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 600.

The final layer of connections in the network is a fully-connected layer that connects every node from the pooling hidden layer 622b to every one of the output nodes in the output layer 624. Using the example above, the input layer includes 28×28 nodes encoding the pixel intensities of the input image, the convolutional hidden layer 622a includes 3×24×24 hidden feature nodes based on application of a 5×5 local receptive field (for the filters) to three activation maps, and the pooling layer 622b includes a layer of 3×12×12 hidden feature nodes based on application of max-pooling filter to 2×2 regions across each of the three feature maps. Extending this example, the output layer 624 can include ten output nodes. In such an example, every node of the 3×12×12 pooling hidden layer 622b is connected to every node of the output layer 624.

The fully connected layer 622c can obtain the output of the previous pooling layer 622b (which should represent the activation maps of high-level features) and determines the features that most correlate to a particular class. For example, the fully connected layer 622c layer can determine the high-level features that most strongly correlate to a particular class, and can include weights (nodes) for the high-level features. A product can be computed between the weights of the fully connected layer 622c and the pooling hidden layer 622b to obtain probabilities for the different classes. For example, if the CNN 600 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 624 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

As previously noted, the neural network detection system 104 can use any suitable neural network based detector. One example includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 7A includes an image and FIG. 7B and FIG. 7C include diagrams illustrating how an SSD detector (with the VGG deep network base model) operates. For example, SSD matches objects with default boxes of different aspect ratios (shown as dashed rectangles in FIG. 7B and FIG. 7C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 7B) are matched with the cat, and one of the 4×4 boxes (shown in red in FIG. 7C) is matched with the dog. SSD has multiple features maps, with each feature map being responsible for a different scale of objects, allowing it to identify objects across a large range of scales. For example, the boxes in the 8×8 feature map of FIG. 7B are smaller than the boxes in the 4×4 feature map of FIG. 7C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 7A, all probability labels would indicate the background class with the exception of the three matched boxes (two for the cat, one for the dog).

Figure 8C:
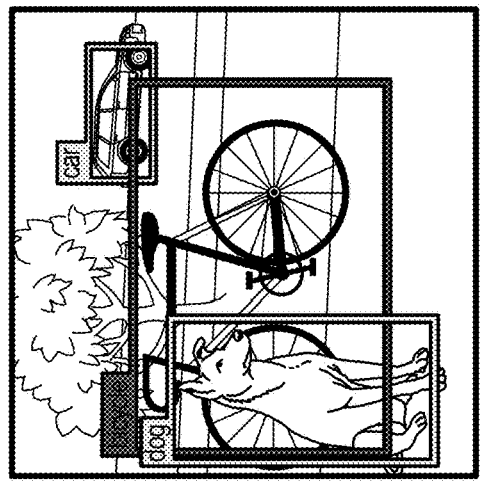
FIG. 8A-FIG. 8C are diagrams illustrating an example of a you only look once (YOLO) detector, in accordance with some examples.
Figure 8B:
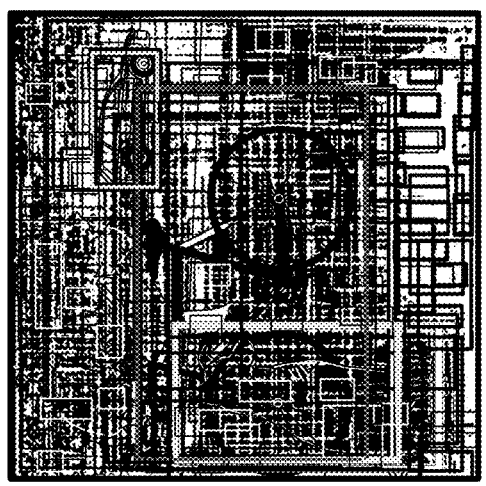
Figure 8A:
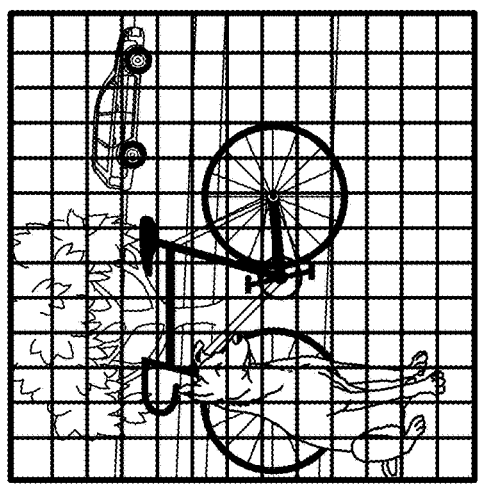

Another deep learning-based detector that can be used by the neural network detection system 104 to detect or classify objects in images includes the You only look once (YOLO) detector, which is an alternative to the SSD object detection system. FIG. 8A includes an image and FIG. 8B and FIG. 8C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 8A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 8B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 8B is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 8C shows an image with the final predicted bounding boxes and classes, including a dog, a bicycle, and a car. As shown, from the 845 total bounding boxes that were generated, only the three bounding boxes shown in FIG. 8C were kept because they had the best final scores.

FIG. 9 is a flowchart illustrating an example of a process 900 of tracking objects in one or more images using the techniques described herein. At block 902, the process 900 includes applying a trained neural network (or "trained network") to a first image of a sequence of images to detect one or more objects in the first image. The trained network is applied to less than all images of the sequence of images. The trained network can include the neural network detection system 104 shown in FIG. 1 and described above.

At block 904, the process 900 includes obtaining a second image of the sequence of images and a detection result from application of the trained network to the first image. The detection result includes the detected one or more objects from the first image. For example, the detection result from the application of the trained network to the first image can be received at the second image. In one illustrative example, the first image can include a first video frame for which the trained network is applied, and the second image can include a sixth video frame, which is the earliest video frame at which the detection result (from application of the trained network to the first image) becomes available.

At block 906, the process 900 includes applying a first object tracker to the second image using the detection result from application of the trained network to the first image. The first object tracker can perform lag compensation to account for the delay in performing object detection for the first image by the trained network. For example, applying the first object tracker can include adjusting one or more locations of one or more bounding boxes associated with the detected one or more objects in the second image to track the detected one or more objects in the second image. For instance, the first object tracker can include the strong object tracker 106 discussed above. As described above, the first object tracker (e.g., the strong object tracker 106) can be run whenever the results from the trained network (e.g., the neural network detection system 104) are available, which is at the second image in this example. In some examples, the one or more locations of the one or more bounding boxes associated with the detected one or more objects in the second image are adjusted based on an estimated movement of the one or more objects between the first image and the second image. For example, any of the above-described tracking techniques, or other tracking techniques, can be used to determine the updated location of a bounding box for lag compensation.

At block 908, the process 900 includes applying a second object tracker to the second image to track at least one object of the detected one or more objects in the second image. The second object tracker is applied to more images of the sequence of images than the trained network. In some cases, the second object tracker is applied to more images of the sequence of images than the trained network and the first object tracker. For example, the second object tracker can be applied to each image of the sequence of images to track one or more objects in each image. In some aspects, the at least one object tracked by the second object tracker in the second image is based on a previous application of the trained network to a previous image obtained before the first image. For example, due to the lag in performing object detection by the trained network, the results of object tracking on the first image may not be available until the second image is obtained. In one illustrative example, the first image may include a frame 10 of a video sequence, and the second image may include a frame 20 of the video sequence.

At block 910, the process 900 includes performing object tracking for the second image based on application of the first object tracker and the second object tracker.

In some examples, the process 900 includes associating the one or more objects tracked by the first object tracker with the at least one object tracked by the second object tracker, and generating a final set of one or more tracked objects for the second image based on the associating the one or more objects tracked by the first object tracker with the at least one object tracked by the second object tracker. In such examples, the object tracking is performed for the second image using the final set of one or more tracked objects.

Associating the one or more objects tracked by the first object tracker with the at least one object tracked by the second object tracker can be performed by comparing a tracking result from the first object tracker for a first object to a tracking result from the second object tracker for the first object. In one illustrative example of when the first object tracker result is used, the object tracking can be performed for the second image using the tracking result from the first object tracker when a confidence of the tracking result from the first object tracker is greater than a confidence of the tracking result from the second object tracker. In another illustrative example of when the second object tracker result is used, the object tracking can be performed for the second image using the tracking result from the second object tracker when a confidence of the tracking result from the second object tracker is greater than a confidence of the tracking result from the first object tracker. In such examples, the tracking result from the first object tracker or the second object tracker can include a bounding box and the confidence of the tracking result from the first object tracker or the confidence of the tracking result from the second object tracker can include a confidence level based on application of the trained network. As noted herein, the confidence level indicates a likelihood that an object associated with a bounding box includes a category determined by the trained network during detection.

In some examples, the process 900 can include applying the second object tracker to a third image to track the at least one object in the third image, in which case the trained network and the first object tracker are not applied to the third image. The process 900 can further include comparing a tracking result from the second object tracker for the at least one object in the third image to a tracking result from the first object tracker for the at least one object in the second image (the image at which lag compensation was performed). The process 900 can further include determining whether to track the at least one object in the third image based on the comparing. In some cases, the at least one object is tracked in the third image when a result of the comparing is above a confidence threshold. In one illustrative example, the comparing can include determining a correlation between the tracking result from the second object tracker and the tracking result from the first object tracker, in which case the confidence threshold can include a threshold correlation. For instance, the at least one object is tracked in the third image when the correlation is above the threshold correlation. In other cases, other suitable quality metrics can be used instead of a confidence, such as variance, standard deviation, feature point matching strength to indicate how many feature points successfully matched between the two thumbnails, Intersection-over-Union (IOU) scores, and/or any other suitable reliability metric.

In some examples, the process 900 may be performed by a computing device or an apparatus, which can include the object detection and tracking system 102 shown in FIG. 1. In some cases, the computing device or apparatus may include a processor, microprocessor, microcomputer, or other component of a device that is configured to carry out the steps of process 900. In some examples, the computing device or apparatus may include a camera configured to capture images and/or video data (e.g., a video sequence) including video frames. For example, the computing device may include a mobile device with a camera (e.g., a camera device such as a digital camera, an IP camera or the like, a mobile phone or tablet including a camera, or other type of device with a camera). In some cases, the computing device may include a display for displaying images. In some cases, the computing device may include a video codec. In some examples, a camera or other capture device that captures the images and/or video data is separate from the computing device, in which case the computing device receives the captured video data. The computing device may further include a network interface configured to communicate the video data. The network interface may be configured to communicate Internet Protocol (IP) based data or other suitable network data.

Process 900 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The video analytics operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of tracking objects in one or more images, the method comprising:
    applying a trained network to a first image of a sequence of images to detect one or more objects in the first image, wherein the trained network is applied to less than all images of the sequence of images;
    obtaining a second image of the sequence of images and a detection result from application of the trained network to the first image, the detection result including the detected one or more objects from the first image;

applying a first object tracker to the second image using the detection result from application of the trained network to the first image, wherein applying the first object tracker includes adjusting one or more locations of one or more bounding boxes associated with the detected one or more objects in the second image to account for movement of the one or more objects from one or more positions in the first image when the trained network is applied to one or more positions in the second image when the detection result is obtained;

applying a second object tracker to the second image to track at least one object of the detected one or more objects in the second image, wherein the second object tracker is applied to more images of the sequence of images than the trained network; and performing object tracking for the second image based on application of the first object tracker and the second object tracker.

2. The method of claim 1, wherein the one or more locations of the one or more bounding boxes associated with the detected one or more objects in the second image are adjusted based on an estimated movement of the one or more objects between the first image and the second image.

3. The method of claim 1, wherein the second object tracker is applied to each image of the sequence of images to track one or more objects in each image.

4. The method of claim 1, wherein the at least one object tracked by the second object tracker in the second image is based on a previous application of the trained network to a previous image obtained before the first image.

5. The method of claim 1, further comprising:
associating the one or more objects tracked by the first object tracker with the at least one object tracked by the second object tracker;
generating a final set of one or more tracked objects for the second image based on the associating the one or more objects tracked by the first object tracker with the at least one object tracked by the second object tracker; and
wherein the object tracking is performed for the second image using the final set of one or more tracked objects.

6. The method of claim 5, wherein associating the one or more objects tracked by the first object tracker with the at least one object tracked by the second object tracker includes:
comparing a first tracking result from the first object tracker for a first object to a second tracking result from the second object tracker for the first object; and
performing the object tracking for the first object in the second image using the first tracking result from the first object tracker when a first confidence associated with the first tracking result from the first object tracker is greater than a second confidence associated with the second tracking result from the second object tracker.

7. The method of claim 6, wherein at least one of the first tracking result from the first object tracker and the second tracking result from the second object tracker includes a bounding box and wherein the first confidence associated with the first tracking result from the first object tracker or the second confidence associated with the second tracking result from the second object tracker includes a confidence level based on application of the trained network, the confidence level indicating a likelihood that an object associated with a bounding box includes a category.

8. The method of claim 5, wherein associating the one or more objects tracked by the first object tracker with the at least one object tracked by the second object tracker includes:
comparing a first tracking result from the first object tracker for a first object to a second tracking result from the second object tracker for the first object; and
performing the object tracking for the first object in the second image using the second tracking result from the second object tracker when a second confidence associated with the second tracking result from the second object tracker is greater than a first confidence associated with the first tracking result from the first object tracker.

9. The method of claim 8, wherein at least one of the first tracking result from the first object tracker and the second tracking result from the second object tracker includes a bounding box and wherein the first confidence associated with the first tracking result from the first object tracker or the second confidence associated with the second tracking result from the second object tracker includes a confidence level based on application of the trained network, the confidence level indicating a likelihood that an object associated with a bounding box includes a category.

10. The method of claim 1, further comprising:
applying the second object tracker to a third image to track the at least one object in the third image, wherein the trained network and the first object tracker are not applied to the third image;
comparing a tracking result from the second object tracker for the at least one object in the third image to a tracking result from the first object tracker for the at least one object in the second image; and
determining whether to track the at least one object in the third image based on the comparing.

11. The method of claim 10, wherein the at least one object is tracked in the third image when a result of the comparing is above a quality threshold.

12. The method of claim 10, wherein the comparing includes determining a correlation between the tracking result from the second object tracker for the at least one object in the third image and the tracking result from the first object tracker for the at least one object in the second image.

13. The method of claim 12, wherein the at least one object is tracked in the third image when the correlation is above a threshold correlation.

14. An apparatus for tracking objects in one or more images, comprising:
a memory configured to store the one or more images; and
a processor configured to:
apply a trained network to a first image of a sequence of images to detect one or more objects in the first image, wherein the trained network is applied to less than all images of the sequence of images;
obtain a second image of the sequence of images and a detection result from application of the trained network to the first image, the detection result including the detected one or more objects from the first image;
apply a first object tracker to the second image using the detection result from application of the trained network to the first image, wherein applying the first object tracker includes adjusting one or more locations of one or more bounding boxes associated with the detected one or more objects in the second image to account for movement of the one or more objects from one or more positions in the first image when the trained network is applied to one or more positions in the second image when the detection result is obtained;

apply a second object tracker to the second image to track at least one object of the detected one or more objects in the second image, wherein the second object tracker is applied to more images of the sequence of images than the trained network;

perform object tracking for the second image based on application of the first object tracker and the second object tracker.

15. The apparatus of claim 14, wherein the one or more locations of the one or more bounding boxes associated with the detected one or more objects in the second image are adjusted based on an estimated movement of the one or more objects between the first image and the second image.

16. The apparatus of claim 14, wherein the second object tracker is applied to each image of the sequence of images to track one or more objects in each image.

17. The apparatus of claim 14, wherein the at least one object tracked by the second object tracker in the second image is based on a previous application of the trained network to a previous image obtained before the first image.

18. The apparatus of claim 14, wherein the processor is further configured to:

associate the one or more objects tracked by the first object tracker with the at least one object tracked by the second object tracker;

generate a final set of one or more tracked objects for the second image based on the associating the one or more objects tracked by the first object tracker with the at least one object tracked by the second object tracker; and wherein the object tracking is performed for the second image using the final set of one or more tracked objects.

19. The apparatus of claim 18, wherein associating the one or more objects tracked by the first object tracker with the at least one object tracked by the second object tracker includes:

comparing a first tracking result from the first object tracker for a first object to a second tracking result from the second object tracker for the first object; and performing the object tracking for the first object in the second image using the first tracking result from the first object tracker when a first confidence associated with the first tracking result from the first object tracker is greater than a second confidence associated with the second tracking result from the second object tracker.

20. The apparatus of claim 19, wherein at least one of the first tracking result from the first object tracker and the second tracking result from the second object tracker includes a bounding box and wherein the first confidence associated with the first tracking result from the first object tracker or the second confidence associated with the second tracking result from the second object tracker includes a confidence level based on application of the trained network, the confidence level indicating a likelihood that an object associated with a bounding box includes a category.

21. The apparatus of claim 18, wherein associating the one or more objects tracked by the first object tracker with the at least one object tracked by the second object tracker includes:

comparing a first tracking result from the first object tracker for a first object to a second tracking result from the second object tracker for the first object; and performing the object tracking for the first object in the second image using the second tracking result from the second object tracker when a second confidence associated with the second tracking result from the second object tracker is greater than a first confidence associated with the first tracking result from the first object tracker.

22. The apparatus of claim 21, wherein at least one of the first tracking result from the first object tracker and the second tracking result from the second object tracker includes a bounding box and wherein the first confidence associated with the first tracking result from the first object tracker or the second confidence associated with the second tracking result from the second object tracker includes a confidence level based on application of the trained network, the confidence level indicating a likelihood that an object associated with a bounding box includes a category.

23. The apparatus of claim 14, wherein the processor is further configured to:

apply the second object tracker to a third image to track the at least one object in the third image, wherein the trained network and the first object tracker are not applied to the third image;

compare a tracking result from the second object tracker for the at least one object in the third image to a tracking result from the first object tracker for the at least one object in the second image; and determine whether to track the at least one object in the third image based on the comparing.

24. The apparatus of claim 23, wherein the at least one object is tracked in the third image when a result of the comparing is above a quality threshold.

25. The apparatus of claim 23, wherein the comparing includes determining a correlation between the tracking result from the second object tracker for the at least one object in the third image and the tracking result from the first object tracker for the at least one object in the second image.

26. The apparatus of claim 25, wherein the at least one object is tracked in the third image when the correlation is above a threshold correlation.

27. The apparatus of claim 14, further comprising a camera for capturing the one or more images.

28. The apparatus of claim 14, wherein the apparatus comprises a mobile device with a camera for capturing the one or more images.

29. The apparatus of claim 14, further comprising a display for displaying the one or more images.

30. A non-transitory computer-readable medium having stored thereon instructions that, when executed by one or more processors, cause the one or more processor to:

apply a trained network to a first image of a sequence of images to detect one or more objects in the first image, wherein the trained network is applied to less than all images of the sequence of images;

obtain a second image of the sequence of images and a detection result from application of the trained network to the first image, the detection result including the detected one or more objects from the first image;

apply a first object tracker to the second image using the detection result from application of the trained network to the first image, wherein applying the first object tracker includes adjusting one or more locations of one or more bounding boxes associated with the detected one or more objects in the second image to account for movement of the one or more objects from one or more positions in the first image when the trained network is applied to one or more positions in the second image when the detection result is obtained;

apply a second object tracker to the second image to track at least one object of the detected one or more objects in the second image, wherein the second object tracker is applied to more images of the sequence of images than the trained network; and perform object tracking for the second image based on application of the first object tracker and the second object tracker.

\* \* \* \* \*